(12) United States Patent
Shellhamer

(10) Patent No.: US 7,788,541 B2
(45) Date of Patent: Aug. 31, 2010

(54) APPARATUS AND METHOD FOR IDENTIFYING DISK DRIVES WITH UNREPORTED DATA CORRUPTION

(75) Inventor: Jeffery Lawrence Shellhamer, Erie, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 293 days.

(21) Appl. No.: 12/183,245

(22) Filed: Jul. 31, 2008

(65) Prior Publication Data

US 2009/0259882 A1 Oct. 15, 2009

Related U.S. Application Data

(60) Provisional application No. 61/044,966, filed on Apr. 15, 2008.

(51) Int. Cl.
*G06F 11/00* (2006.01)
(52) U.S. Cl. ...................................................... 714/42
(58) Field of Classification Search .................... 714/42
See application file for complete search history.

(56) References Cited

U.S. PATENT DOCUMENTS

| | | | | | |
|---|---|---|---|---|---|
| 5,579,475 | A | * | 11/1996 | Blaum et al. ................... | 714/7 |
| 5,682,272 | A | * | 10/1997 | Taroda et al. ................. | 360/53 |
| 6,678,107 | B1 | * | 1/2004 | Krehbiel et al. ............... | 360/53 |
| 6,854,022 | B1 | * | 2/2005 | Thelin ........................... | 710/5 |
| 7,050,252 | B1 | * | 5/2006 | Vallis ........................... | 360/53 |
| 7,146,461 | B1 | | 12/2006 | Kiselev et al. | |
| 7,274,639 | B1 | * | 9/2007 | Codilian et al. .......... | 369/53.17 |
| 7,529,982 | B1 | * | 5/2009 | Coatney et al. ............... | 714/54 |
| 2003/0070109 | A1 | * | 4/2003 | Harada .......................... | 714/2 |
| 2004/0168024 | A1 | * | 8/2004 | Buckingham ................ | 711/111 |
| 2005/0028048 | A1 | * | 2/2005 | New et al. ...................... | 714/54 |
| 2005/0066254 | A1 | * | 3/2005 | Grainger et al. ............. | 714/764 |
| 2006/0031722 | A1 | * | 2/2006 | Kolvick et al. ................ | 714/52 |
| 2006/0129876 | A1 | * | 6/2006 | Uemura ......................... | 714/6 |
| 2008/0155314 | A1 | * | 6/2008 | Forrer et al. ................... | 714/6 |
| 2008/0183963 | A1 | * | 7/2008 | He et al. ....................... | 711/114 |
| 2009/0055681 | A1 | * | 2/2009 | Dholakia et al. .............. | 714/6 |
| 2009/0055682 | A1 | * | 2/2009 | Gibson et al. ................. | 714/6 |

OTHER PUBLICATIONS

Iliadis, Ilias et al. "Disk Scrubbing Versus Intra-disk Redundancy for High Reliability RAID Storage Systems" 2008, SIGMETRICS'08 ACM.*

* cited by examiner

*Primary Examiner*—Bryce P Bonzo
(74) *Attorney, Agent, or Firm*—Thomas J. Lavan; E. Alan Davis

(57) ABSTRACT

A RAID controller uses a method to identify a storage device of a redundant array of storage devices that is returning corrupt data to the RAID controller. The method includes reading data from a location of each storage device in the redundant array a first time, and detecting that at least one storage device returned corrupt data. In response to detecting corrupt data, steps are performed for each storage device in the redundant array. The steps include reading data from the location of the storage device a second time without writing to the location in between the first and second reads, comparing the data read the first and second times, and identifying the storage device as a failing storage device if the compared data has a miscompare. Finally, the method includes updating the location of each storage device to a new location and repeating the steps for the new location.

32 Claims, 19 Drawing Sheets

APPARATUS AND METHOD FOR IDENTIFYING DISK DRIVES WITH UNREPORTED DATA CORRUPTION

CROSS REFERENCE TO RELATED APPLICATION(S)

This application claims the benefit of U.S. Provisional Application Ser. No. 61/044,966, filed Apr. 15, 2008, which is hereby incorporated by reference for all purposes.

FIELD OF THE INVENTION

The present invention relates in general to the field of RAID controllers and particularly to an apparatus and method for identifying defective storage devices when data corruption is not reported by the storage device.

BACKGROUND OF THE INVENTION

The need to store digital files, documents, pictures, images and other data continues to increase rapidly. In connection with the electronic storage of data, systems incorporating more than one storage device have been devised. In general, using a number of storage devices in a coordinated fashion in order to store data can increase the total storage volume of the system. In addition, data can be distributed across the multiple storage devices such that data will not be irretrievably lost if one of the storage devices (or in some cases more than one storage device) fails. An additional advantage that can be achieved by coordinating the operation of a number of individual storage devices is improved data access and/or storage times. Examples of systems that can provide such advantages can be found in the various RAID (redundant array of independent disks) levels that have been developed.

RAID systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical storage devices in such a manner as to present a single logical storage device (or multiple logical storage devices) to a computer operating system. RAID controllers employ the techniques of data striping and data redundancy to increase performance and data availability.

Not all RAID levels provide data redundancy, however. For example, a RAID 0 array uses a striping technique to store data stripe-wise across multiple storage devices, but does not provide a copy of the data stored elsewhere on storage devices of the array that can be used to reconstruct data if a storage device fails. RAID levels that provide redundancy are divided into two categories: those that are parity-based, and those that are mirror-based. Parity-based RAID levels calculate parity from data that is written to the RAID array, and store it on a different storage device than the storage devices used to store the data itself. Parity-based RAID levels include RAID levels 3, 4, 5, 6, 30, 40, and 50. Mirror-based RAID levels store a copy of data written to the RAID array to a different storage device from the device used to store the data itself. Mirror-based RAID levels include RAID levels 1 and 10.

According to RAID level 1, data stored in a primary storage device is mirrored to a secondary storage device. Therefore, RAID level 1 requires at least two storage devices to implement. Furthermore, if more than two storage devices are desired, additional storage devices are added in pairs. That is, RAID level 1 requires an even number of storage devices. During normal operation, write operations result in a primary copy of data being written to the primary storage device and a mirrored copy being written to the secondary storage device, and read operations are made with respect to the copy of data on either the primary or secondary storage device. If one storage device within a RAID level 1 array fails, data stored on that storage device can be rebuilt onto a replacement storage device by copying the data stored on the failed storage device's companion storage device to the replacement storage device. Another example of a mirror-based RAID level is RAID level 10. RAID level 10 mirrors a striped set of storage devices, and requires a minimum of four storage devices to implement. Data is striped across multiple storage devices, which improves I/O performance for RAID 10 compared with RAID 1.

Other RAID levels combine data storage devices with parity storage devices, which is either stored on a dedicated parity storage device or distributed among data storage devices. Examples of such arrangements include RAID levels 3, 4, 5, 6, 30, 40, and 50. Although such arrangements provide for fault tolerance, and can provide somewhat improved I/O performance, they all require at least three storage devices to implement, and require fairly complex controller and parity generation circuitry or software. All of the parity-based RAID levels can tolerate a single storage device failure, but RAID 6 can tolerate up to two simultaneous storage device failures.

RAID subsystems commonly employ spare storage devices. Spare storage devices are able to replace storage devices identified by the RAID controller, software, or system administrator as failed or failing storage devices. Rebuild of data from a failed or failing storage device to an available spare storage device may occur as directed by a system administrator, or as a result of an automated rebuild process within the RAID controller or software.

In computer terminology, a check condition occurs when a SCSI device needs to report an error. SCSI communication takes place between an initiator and a target. The initiator sends a command to the target which then responds. SCSI commands are sent in a Command Descriptor Block (CDB). At the end of the command the target returns a status code byte which is usually 00h for success, 02h for a check condition (error), or 08h for busy. When the target returns a check condition in response to a command, the initiator usually then issues a SCSI request sense command in order to obtain more information. During the time between the reporting of a check condition and the issuing of a request sense command, the target is in a special state called contingent allegiance.

In most cases, a storage device will detect and correct internal media errors via Error Correction Codes (ECC) and various retry mechanisms. When the storage device is unable to correct the data, it will post a check condition in final status. The controller will then issue a request sense command to the storage device and process the sense data. If the sense data indicates a media error, the controller can correct the bad data using RAID parity data for a parity-based array and RAID mirror data for a mirror-based array. Data is read from the good storage devices (the storage devices not reporting the media error), data is generated corresponding to the data on the storage device reporting the media error, and data is written to an available spare storage device—which then replaces the storage device with the media error in the redundant array.

Although redundant RAID arrays protect against single storage device failures quite well, there are other classes of problems where storage devices do not detect and report an error, but instead return data that is different from the data that was previously written to the storage device at the location now being read. Occasionally, a storage device will fail in such a manner that it is unable to detect that it is returning corrupted data to the controller. This may be the result of a storage device not writing properly to media within the storage device, or by storing the data properly, but changing the data in some fashion between reading the data from the media and transmitting the data to the controller. For corrupted reads, the observed failure mode has been dropped bits. The failure is transient, that is, given multiple reads of the same block(s), there may be some good reads, and even subsequent bad reads may have dropped different bits from previous bad reads. Typically, just one bit is dropped in a stream of data, whether that stream is a single block or multiple blocks. Generally, there are no other indicators that provide possible identification of the bad storage device.

Without error indication from the storage device, the controller in turn passes this bad data to the requesting host computer. This may possibly result in a host computer software crash, bad data being used by a host computer, or bad data passed to client computers. It is therefore advantageous to find and replace any storage devices that exhibit this type of storage device failure at the storage controller level, before reaching a host computer.

In the context of a RAID array employing multiple storage devices per logical storage device, the challenge is in identifying which of a group of storage devices is the storage device that is corrupting data. It is presumed that a single storage device may be replaced in a parity-based or mirror-based RAID array without data loss, or up to two storage devices in a RAID 6 array. Therefore, what is needed is a method to detect unreported data corruption, and automatically identify storages device(s) causing such unreported corruption.

BRIEF SUMMARY OF INVENTION

The present invention includes a method for a RAID controller to identify a storage device of a redundant array of storage devices that is returning corrupt data to the RAID controller. The method includes reading data from a location of each storage device in the redundant array of storage devices a first time, and detecting that at least one storage device in the redundant array returned corrupt data. In response to detecting that at least one storage device in the redundant array returned corrupt data, the method includes performing the following steps for each storage device in the redundant array: reading data from the location of the storage device a second time without writing to the location in between the reading the first and second times, comparing the data read from the location of the storage device the first time with the data read from the location of the storage device the second time, and identifying the storage device as a failing storage device if the data read from the storage device the first time miscompares with the data read from the storage device the second time. Finally, the method includes updating the location of each storage device to a new location and repeating the reading, comparing, and identifying for the new location.

In one aspect, the present invention provides a RAID controller that identifies a storage device of a redundant array of storage devices that is returning corrupt data to the RAID controller. The RAID controller includes a memory. The RAID controller also includes a processor, coupled to the memory, configured to cause data to be read into the memory from a location of each storage device in the redundant array of storage devices a first time, and detect that at least one storage device in the redundant array returned corrupt data. In response to detecting that at least one storage device in the redundant array returned corrupt data, for each storage device in the redundant array the RAID controller causes data to be read into the memory from the location of the storage device a second time without writing to the location in between causing the data to be read the first and second times, causes the data read from the location of the storage device the first time to be compared with the data read from the location of the storage device the second time, and identifies the storage device as a failing storage device if the data read from the storage device the first time miscompares with the data read from the storage device the second time. The RAID controller updates the location of each storage device to a new location and repeats the reading the first time, detecting, reading the second time, and identifying for the new location.

In another aspect, the present invention provides a method for a RAID controller to identify a storage device of a redundant array of storage devices that is returning corrupt data to the RAID controller. The method includes detecting that at least one storage device in the redundant array is returning corrupt data. In response to detecting that at least one storage device in the redundant array returned corrupt data, for each storage device in the redundant array, the RAID controller reads data from a location of the storage device a first time and reads data from the location of the storage device a second time without writing to the location in between the reading the first and second times, compares the data read the first time with the data read the second time, identifies the storage device as the failing storage device if the data read the first time miscompares with the data read the second time, and updates the location of the storage device to a new location and repeats the reading, comparing, and identifying steps for the new location.

In another aspect, the present invention provides a computer program product to identify a storage device of a redundant array of storage devices that is returning corrupt data to a computer. The computer program product includes first program code for reading data from a location of each storage device in the redundant array of storage devices a first time. The computer program product includes second program code for detecting that at least one storage device in the redundant array returned corrupt data. The computer program product includes third program code for performing the following steps for each storage device in the redundant array in response to the detecting that at least one storage device in the redundant array returned corrupt data: reading data from the location of the storage device a second time without writing to the location in between the reading the first and second times, comparing the data read from the location of the storage device the first time with the data read from the location of the storage device the second time, and identifying the storage device as a failing storage device if the data read from the storage device the first time miscompares with the data read from the storage device the second time. The computer program product also provides fourth program code for updating the location of each storage device to a new location and repeats execution of the first, second, and third program code for the new location.

In another aspect, the present invention provides a RAID controller that identifies a storage device of a redundant array of storage devices that is returning corrupt data to the RAID controller. The RAID controller includes a memory. The RAID controller also includes a processor, coupled to the memory, configured to detect that at least one storage device in the redundant array returned corrupt data. In response to detecting that at least one storage device in the redundant array returned corrupt data, for each storage device in the redundant array, the RAID controller causes data to be read into the memory from a location of the storage device in the redundant array of storage devices a first time, causes data to be read into the memory from the location of the storage device a second time without writing to the location in between causing the data to be read the first and second times, causes the data read from the location of the storage device the first time to be compared with the data read from the location of the storage device the second time, and identifies the storage device as a failing storage device if the data read from the storage device the first time miscompares with the data read from the storage device the second time. The RAID controller updates the location of each storage device to a new location and repeats the detecting, reading, comparing, and identifying steps for the new location.

An advantage of a RAID controller that identifies a storage device of a redundant array of storage devices that is returning corrupt data to the RAID controller is that it places no greater storage burden on the storage devices in the RAID array beyond what is already required for a specific RAID level. That is, the same numbers of storage devices are required as for a specific RAID level, and no storage within the RAID array is required to practice the invention. This saves cost and storage space on storage devices, allowing the maximum amount of data to be stored on the available number of storage devices for a given RAID level. Another advantage of the present invention is the minimal performance impact to the RAID controller compared with other approaches that perform full-time error detection and correction. In one embodiment, the scrub operation is terminated when a stripe coherency check fails, resulting in faster performance to analyze the rest of the RAID array where the stripe coherency check failed. Another advantage of the present invention is that in one embodiment, blocks of a storage device are not analyzed after that storage device has already been identified as a failing storage device. This saves time when analyzing blocks of data in a RAID array by reducing the number of blocks that must be analyzed after identifying a first failed storage device. Another advantage is the stripe coherency checking can be enabled to occur only when host I/O requests are not occurring. Therefore, I/O performance to host computers will not be affected in the absence of errors.

Other features and advantages of the present invention will become apparent upon study of the remaining portions of the specification and drawings.

BRIEF DESCRIPTION OF THE DRAWINGS

FIG. 14b is a block diagram illustrating the first portion of the scrub process of the preferred embodiment, applied to the RAID 5 array 1400 of FIG. 14a.

FIG. 14c is a block diagram illustrating the first portion of the analyze process of the preferred embodiment of FIG. 10, applied to the RAID 5 array 1400 of FIG. 14a.

FIG. 14d is a block diagram illustrating the second portion of the scrub process of the preferred embodiment, applied to the RAID 5 array 1400 of FIG. 14a.

FIG. 14e is a block diagram illustrating the third portion of the scrub process of the preferred embodiment, applied to the RAID 5 array 1400 of FIG. 14a.

FIG. 14f is a block diagram illustrating the second portion of the analyze process of the preferred embodiment of FIG. 10, applied to the RAID 5 array 1400 of FIG. 14a.

FIG. 15a is a block diagram illustrating the second portion of the analyze process of the alternate embodiment of FIG. 11, applied to the RAID 5 array 1400 of FIG. 14a.

FIG. 15b is a block diagram illustrating the third portion of the analyze process of the alternate embodiment of FIG. 11, applied to the RAID 5 array 1400 of FIG. 14a.

FIG. 16a is a block diagram illustrating the second portion of the analyze process of the alternate embodiment of FIG. 12, applied to the RAID 5 array 1400 of FIG. 14a.

FIG. 16b is a block diagram illustrating the third portion of the analyze process of the alternate embodiment of FIG. 12, applied to the RAID 5 array 1400 of FIG. 14a.

DETAILED DESCRIPTION

The RAID controller embodiments described herein have on-board verify or scrub utilities that can be used to check the integrity of a redundant RAID array. Verify utilities for parity-based arrays read data, calculate parity, and compare to stored parity. The verify utilities for mirror-based arrays read data and compare to mirrored data on other storage devices. The scrub utilities perform the same comparison as verify utilities, plus they also may perform reading/comparing metadata in addition to the user data, reset SMART data (clears drive reports after processing any available data), and create a record of all data miscompares.

Verify or scrub utilities may be utilized in other than a user-initiated fashion. For example, such background checking as required here may be part of the core operation of a storage controller, and conducted at all times or at scheduled times on all data read from storage devices. It may also be performed by host software thru a host bus adapter (HBA), software in an intermediate storage appliance or switch, or within a storage controller in any combination of hardware, software, or firmware.

Although a verify or scrub utility can be used to detect that as a whole a redundant array of storage devices is returning unreported corrupt data, conventional verify and scrub utilities do not determine which particular physical storage device within the failing redundant array is returning the corrupt data. Advantageously, embodiments of the present invention described herein also determine which particular physical storage device within a redundant array is returning corrupt data without reporting the corruption.

Figure 1A:
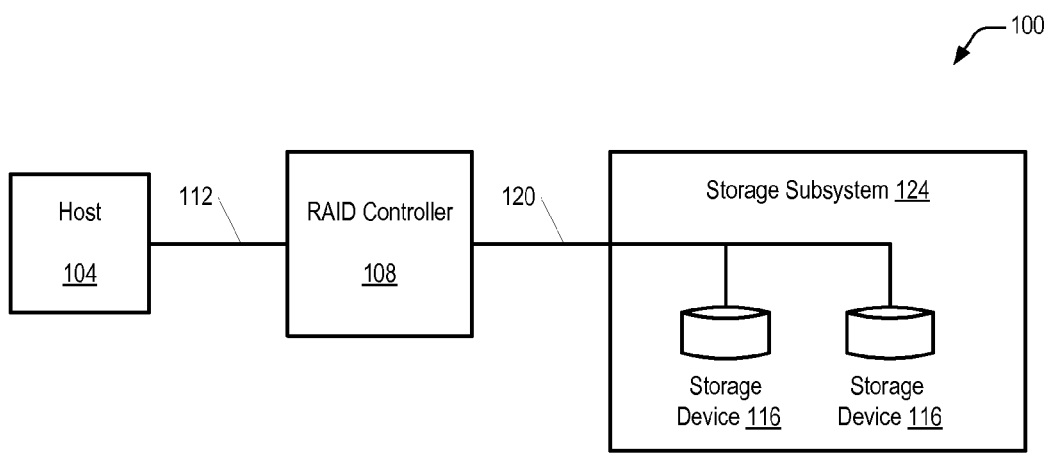
FIG. 1a is a block diagram illustrating an external RAID embodiment of RAID storage system 100 of the present invention.

Referring now to FIG. 1a, a block diagram illustrating an external RAID embodiment of RAID storage system 100 of the present invention is shown. Host computer 104 writes and reads data to and from RAID controller 108 across host bus 112. Such a system may have multiple host computers 104 coupled to multiple RAID controllers 108 across multiple host buses 112. RAID controller 108 receives write requests from host computers 104, formats data according to well known RAID storage methods, and writes the data to multiple storage devices 116 across storage bus 120. Typically, storage devices 116 are located within storage subsystem 124, which provides redundant power and cooling for storage devices 116, and hot pluggable access for each storage device 116. At least two storage devices are required to create a redundant RAID configuration (RAID 1), although more storage devices may be used. The upper limit is dictated by the RAID level supported, the number of storage devices that may be accommodated by storage subsystem 124, and design constraints of RAID controller 108.

Host computers 104 may be any type of computer, such as a personal computer (PC), server, workstation, or supercomputer. Host bus 112 is any appropriate interconnection that allows direct or networked communication between host computers 104 and RAID controllers 108. Common interconnections for host bus 112 include Fibre Channel, SCSI, SSA, Infiniband, iSCSI, Serial attached SCSI (SAS), or Ethernet, although any such suitable bus may be utilized. Such a bus may be in a direct connect, bus, loop, fabric, or any other topology, and may be part of a larger communication or storage network. Storage devices 116 include disk drives, tape drives, optical drives, solid state drives, memory devices, or any other appropriate devices intended for mass storage of data. Storage bus 120 is any appropriate interconnection that allows direct or networked communication between RAID controllers 108 and storage devices 116. Common interconnections for storage bus 120 include Fibre Channel, SCSI, SSA, Infiniband, iSCSI, Serial attached SCSI (SAS), Parallel ATA (ATA), Serial ATA (SATA), or Ethernet, although any such suitable bus may be utilized. Such a bus may be in a direct connect, bus, loop, fabric, or any other topology, and may be part of a larger storage network. A storage bus 120 to a specific storage device 116 may be a different type or topology than another storage bus 120 to a different storage device 116. Multiple storage buses 120 may be present, with a minimum of one storage device 116 per storage bus 120.

Figure 1B:
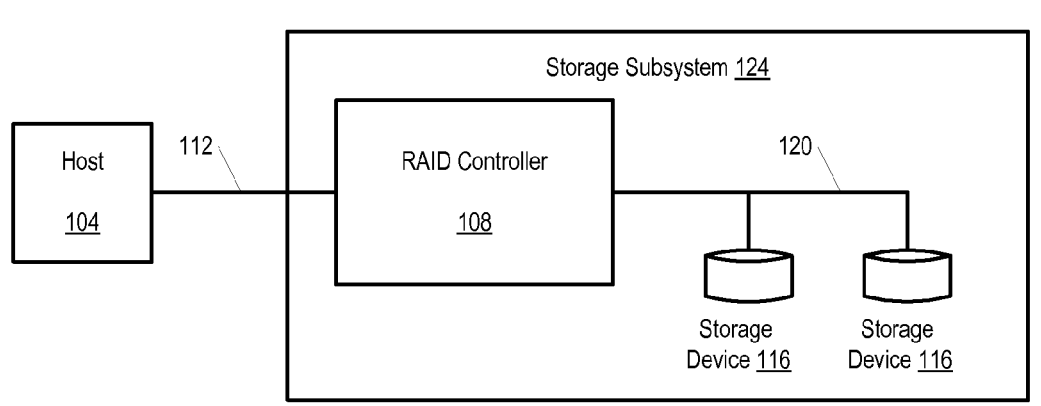
FIG. 1b is a block diagram illustrating another external RAID embodiment of RAID storage system 100 of the present invention.

Referring now to FIG. 1b, a block diagram illustrating another external RAID embodiment of RAID storage system 100 of the present invention is shown. This RAID storage system 100 is similar to the RAID storage system 100 of FIG. 1a, except that RAID controller 108 is within storage subsystem 124. Such an approach is often less costly than the embodiment of FIG. 1a since the packaging, power supplies, and cooling for RAID controller 108 is combined with storage devices 116. This approach may also allow a lower cost storage bus 120 to be used, since only connections internal to storage subsystem 124 are required.

Figure 2A:
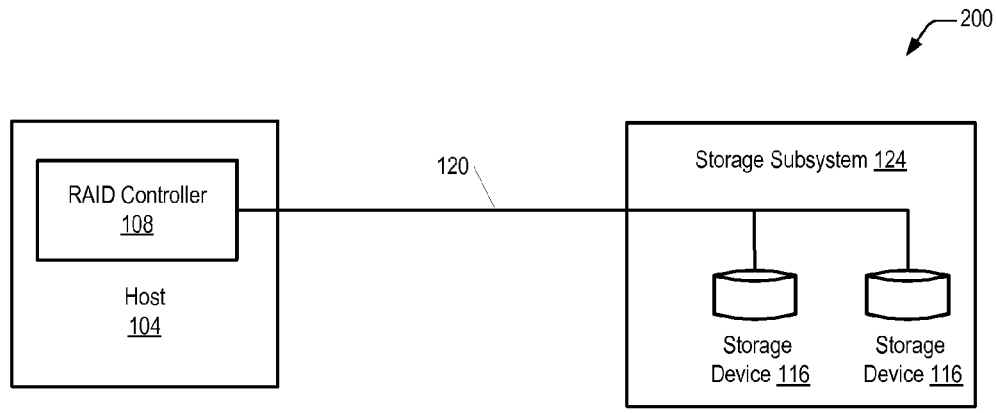
FIG. 2a is a block diagram illustrating an internal RAID embodiment of RAID storage system 200 of the present invention.

Referring now to FIG. 2a, a block diagram illustrating an internal RAID embodiment of RAID storage system 200 of the present invention is shown. The RAID storage system 200 has a RAID controller 108 within host computer 104, instead of external to a host computer as shown in FIGS. 1a and 1b. RAID controller 108 is connected to storage devices 116 in storage subsystem 124 by storage bus 120. RAID controller 108 of FIG. 2a is coupled to host computer 104 by a connection not shown in FIG. 2a. Such a connection is typically provided by a common local bus such as PCI, PCI-X, PCI Express, or Rapid I/O, although any such local bus may be used to couple RAID controller 108 to host computer 104.

Figure 2B:
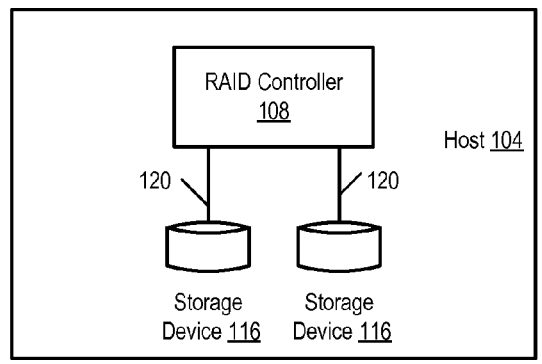
FIG. 2b is a block diagram illustrating another internal RAID embodiment of RAID storage system 200 of the present invention.

Referring now to FIG. 2b, a block diagram illustrating another internal RAID embodiment of RAID storage system 200 of the present invention is shown. This RAID storage system 200 locates RAID controller 108, storage buses 120, and storage devices 116 within host computer 104. This arrangement is sometimes used in desktop computers in order to provide RAID functionality at minimal hardware cost. RAID controller 108 is often implemented within the motherboard chipset of host computer 104, or may be a separate add-in card. Storage devices 116 are located within host computer 104, and usually utilize low-cost storage buses 120 such as ATA or SATA. Storage devices 116 may share a single storage bus 120, or use multiple storage buses 120.

Figure 2C:
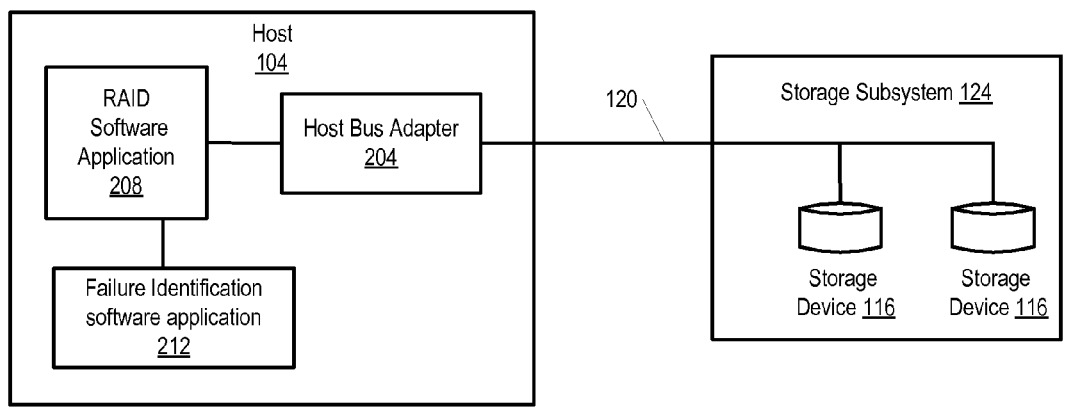
FIG. 2c is a block diagram illustrating yet another internal RAID embodiment of RAID storage system 200 of the present invention.

Referring now to FIG. 2c, a block diagram illustrating yet another internal RAID embodiment of RAID storage system 200 of the present invention is shown. This RAID storage system 200 utilizes host bus adapter 204 to provide connection between host computer 104 and storage devices 116 in storage subsystem 124. Host bus adapter 204 is coupled to host computer 104 by a local bus connection as discussed earlier. Host adapter 204 does not provide RAID functionality, so RAID software application 208 is provided in the operating system or as a separate device driver or software application in host computer 104. RAID software application 208 receives I/O requests from the operating system of host computer 104, and converts the I/O request into individual reads and writes to storage devices 116. It also manages striping across storage devices, manages storage device failures and bad block replacement, and performs all other functions performed by RAID controller 108. Another software application, a failure identification software application 212, is shown in FIG. 2c. Failure identification software application 212 identifies failing storage devices 116, according to the present invention, and will be described later in more detail. This application 212 communicates with RAID software application 208, and may also be combined with RAID software application 208 as a single, unified software application. Failure identification software application 212 may also be configured as part of RAID controller 108 in other embodiments taught herein, or as a software application running on a computer that communicates with RAID controller.

Figure 3:
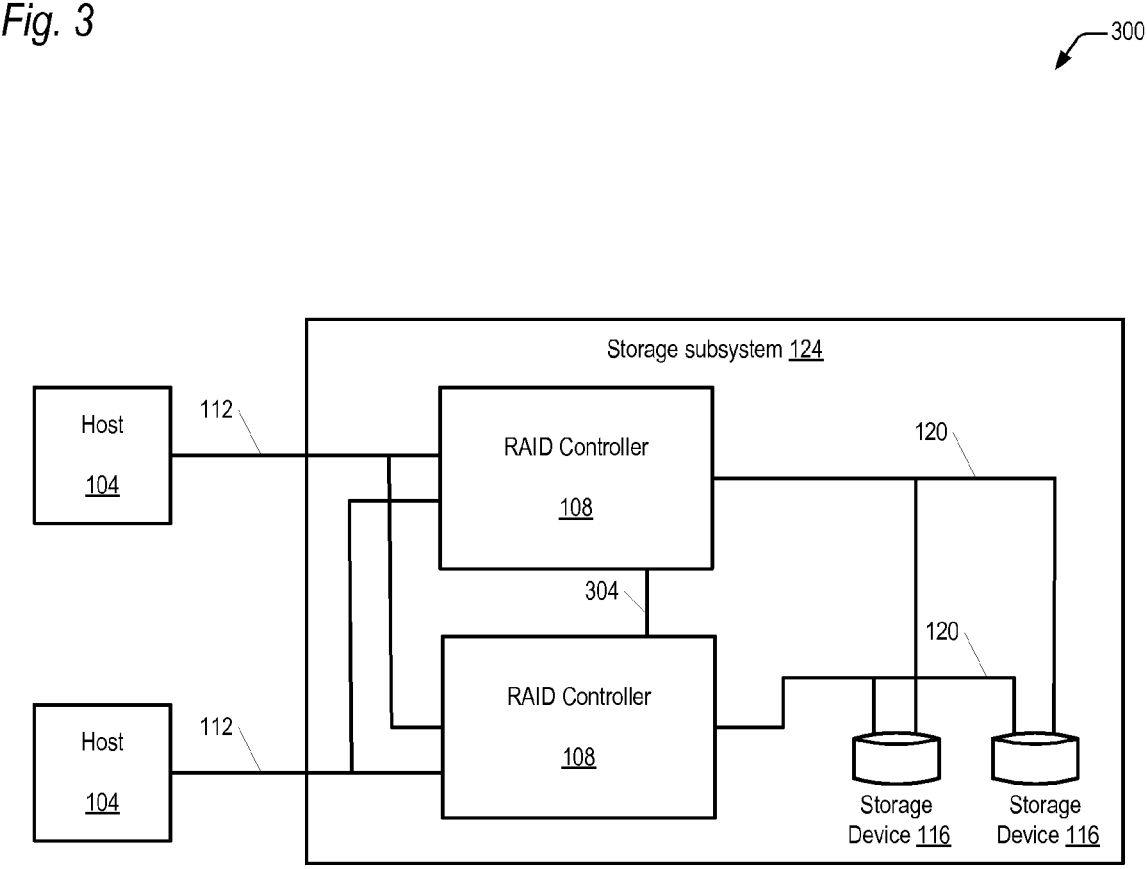
FIG. 3 is a block diagram illustrating another external RAID embodiment of RAID storage system 300 of the present invention.

Referring now to FIG. 3, a block diagram illustrating another external RAID embodiment of RAID storage system 300 of the present invention is shown. This configuration of RAID storage system 300 is commonly found in mass storage applications, where no single point of failure can be tolerated. Host computers 104 provide separate host bus interconnection 112 to each of two redundant RAID controllers 108. Each of redundant RAID controllers 108 provides a connection independent from the other RAID controller 108 to each of storage devices 116 through a separate storage bus 120. Typically, both RAID controllers 108 and storage devices 116 are within storage subsystem 124, although additional storage subsystems 124 may be provided to support more storage devices 116. RAID controllers 108 typically operate in an active-active configuration, where both controllers perform I/O operations in normal operation, and where a surviving RAID controller 108 takes over for a failing RAID controller 108 upon detecting that RAID controller 108 is failing. Intercommunication bus 304 couples each of the two RAID controllers 108 directly, and provides health monitoring and communications between RAID controllers 108 so that each RAID controller 108 can identify when it needs to take over for a failing RAID controller 108. In lieu of intercommunication bus 304, RAID controllers 108 may instead communicate and monitor health of the other controller over any host bus 112 or storage bus 120, as long as the host bus 112 or storage bus 120 is connected to both RAID controllers 108.

As was taught in the description of FIG. 2c, failure identification software application 212 may run on each RAID controller 108, or host computer 104. If failure identification software application 212 runs on each of RAID controller 108, intercommunication bus 304, host bus 112, or storage bus 120 may be used to communicate results of failure identification testing between RAID controllers 108. If failure identification software application 212 runs on a host computer 104, a host bus 112 may be used to communicate results of failure identification to either or both RAID controllers 108.

Figure 4A:
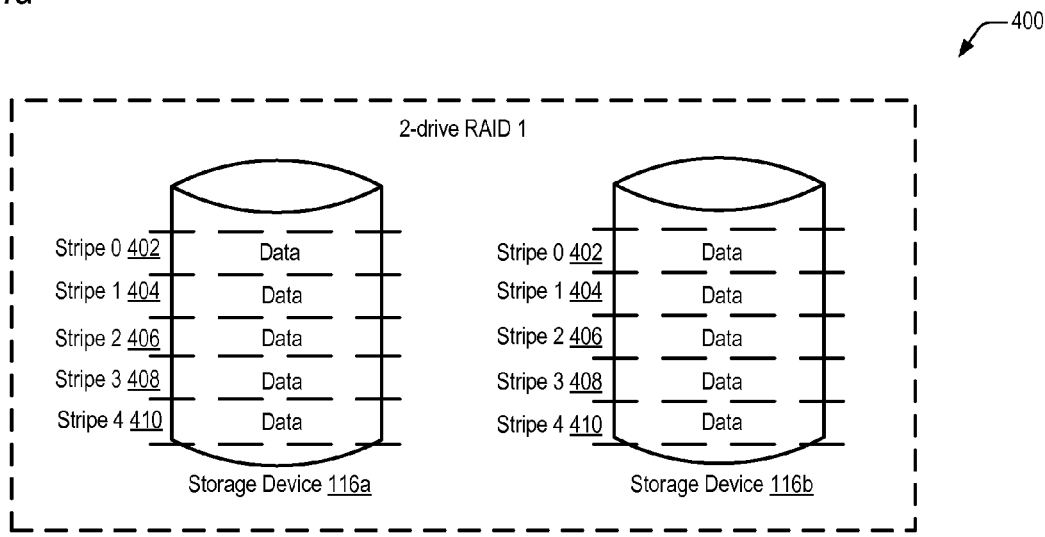
FIG. 4a is a block diagram illustrating organization of data on storage devices 116 for a 2-drive RAID 1 400 configuration of the present invention.

Referring now to FIG. 4a, a block diagram illustrating organization of data on storage devices 116 for a 2-drive RAID 1 400 configuration of the present invention is shown. The 2-drive RAID 1 configuration 400 is the only redundant RAID configuration that uses two storage devices 116. Data is organized on each storage device 116 in equal-size stripes 402-410, where stripe size depends on tradeoffs between performance and storage efficiency and design limitations. In one embodiment, the size of a stripe is 128 blocks of 512 bytes, for a total of 65536 bytes. Storage devices 116 are usually addressed by RAID controller 108 as a number of data blocks to be stored at a starting Logical Block Address (LBA) of a physical storage device 116. For a write from host computer 104 to RAID controller 108, RAID controller 108 determines which stripe 402-410 of storage device 116 the write should initially be directed to. If the size of the write exceeds the available space within the current stripe 402-410 of storage device 116, the write continues in the next stripe 402-410 of the same storage device 116. This continues until all data in the I/O request from host computer 104 has been written to storage device 116. Once the write to storage device 116a is completed, RAID controller 108 performs the same write in the same stripe(s) to the other storage device 116b. Although five stripes 402-410 are depicted in FIG. 4a for ease of illustration, it should be understood that storage devices commonly have many hundreds or thousands of stripes. For the 2-drive RAID 1 configuration 400 shown, the data stored on storage device 116a should always be identical to the data stored on storage device 116b before or after any write operation.

Figure 4B:
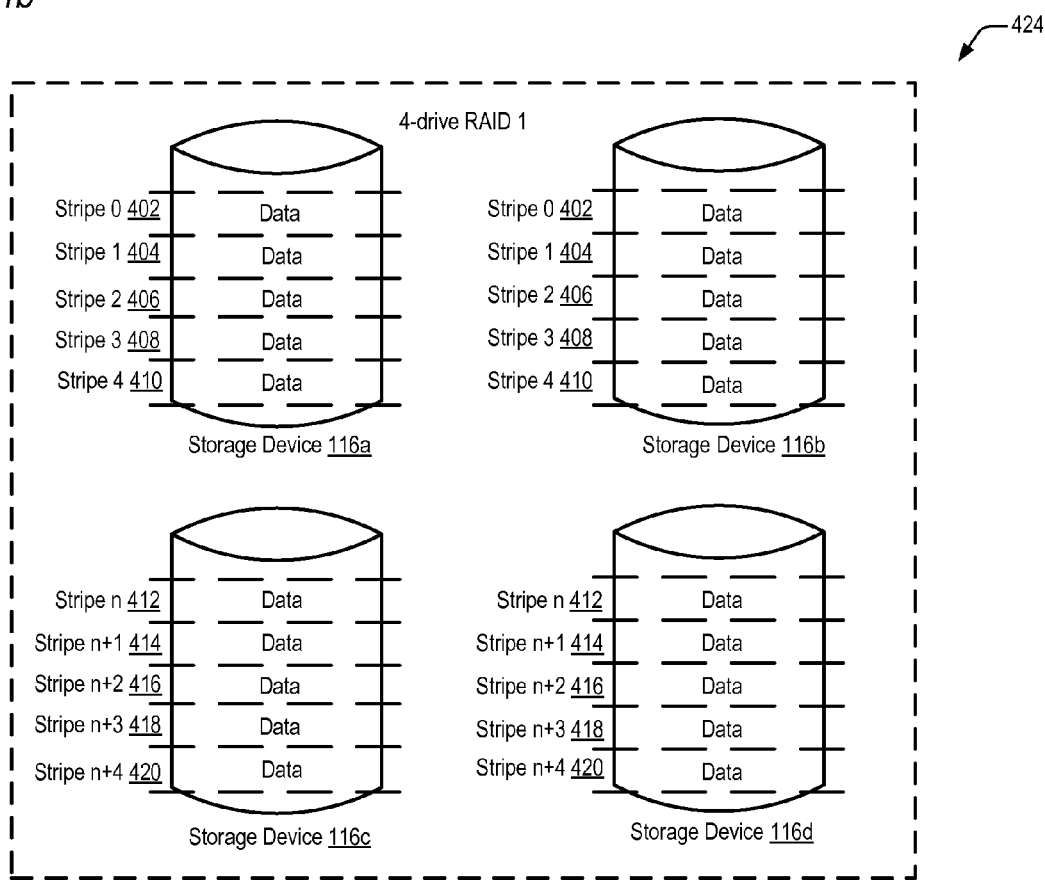
FIG. 4b is a block diagram illustrating organization of data on storage devices 116 for a 4-drive RAID 1 configuration 424 of the present invention.

Referring now to FIG. 4b, a block diagram illustrating organization of data on storage devices 116 for a 4-drive RAID 1 configuration 424 of the present invention is shown. Four storage devices 116a, 116b, 116c, and 116d are shown. Data on storage device 116a is mirrored to storage device 116b, and data on storage device 116c is mirrored to storage device 116d. Thus, the 4-drive RAID 1 configuration 424 of FIG. 4b is simply an expansion of the 2-drive RAID 1 configuration 400 of FIG. 4a, by two storage devices 116c and 116d. The stripes of data n 412 to n+4 420 on storage devices 116c and 116d are a concatenation of the stripes on storage devices 116a and 116b, with stripe n 412 of storage devices 116c and 116d being addressed immediately after the last stripe of storage devices 116a and 116b, respectively. If stripe 4 410 is the last stripe of storage devices 116a and 116b, then stripe n 412 of storage devices 116c and 116d is the next consecutively addressed stripe of 4-drive RAID 1 array 424.

Figure 4C:
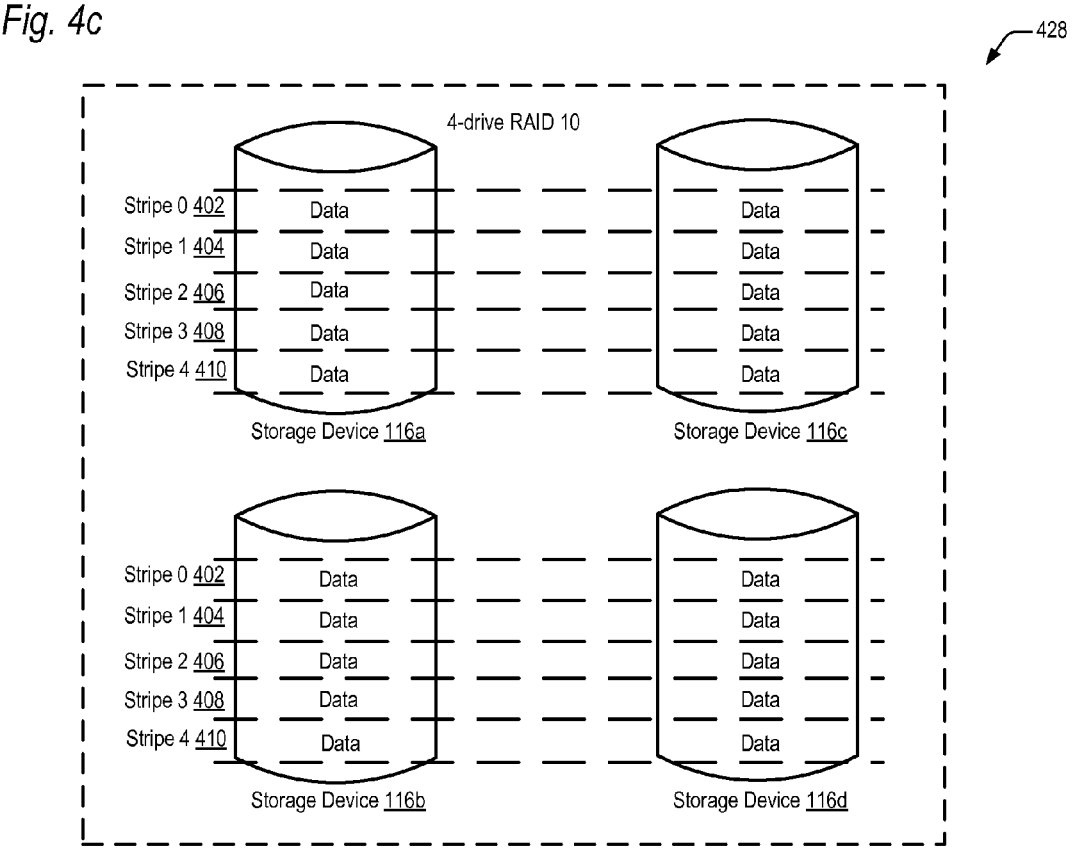
FIG. 4c is a block diagram illustrating organization of data on storage devices 116 for a 4-drive RAID 10 configuration 428 of the present invention.

Referring now to FIG. 4c, a block diagram illustrating organization of data on storage devices 116 for a 4-drive RAID 10 configuration 428 of the present invention is shown. Although this configuration uses 4 storage devices 116a-116d, the same as 4-drive RAID 1 configuration 424, data is organized differently. In 4-drive RAID 1 configuration 424, a stripe only spans a single storage device 116. In 4-drive RAID 10 configuration 428, a stripe spans two storage devices 116a and c or 116b and d. If data is being written by RAID controller 108 to stripe 2 406 of storage device 116a, and the write is larger than the available space in stripe 2 406 of storage device 116a, RAID controller 108 will continue the write in stripe 2 406 of storage device 116c. This is different than was shown in FIG. 4b, where if the write was larger than the available space in stripe 2 406 of storage device 116a, RAID controller 108 will continue the write in stripe 3 408 of storage device 116a. If the data is being written by RAID controller 108 to stripe 2 406 of storage device 116c, and the write is larger than the available space in stripe 2 406 of storage device 116c, RAID controller 108 will continue the write in stripe 3 408 of storage device 116a. Once a write is completed to storage devices 116a and c, RAID controller 108 repeats the same write to the mirrored stripes on storage devices 116b and d. Stripe 0 402 on storage devices 116a and c is mirrored to stripe 0 402 on storage devices 116b and d. Stripe 1 404 on storage devices 116a and c is mirrored to stripe 1 404 on storage devices 116b and d, in a continuing fashion.

Figure 4D:
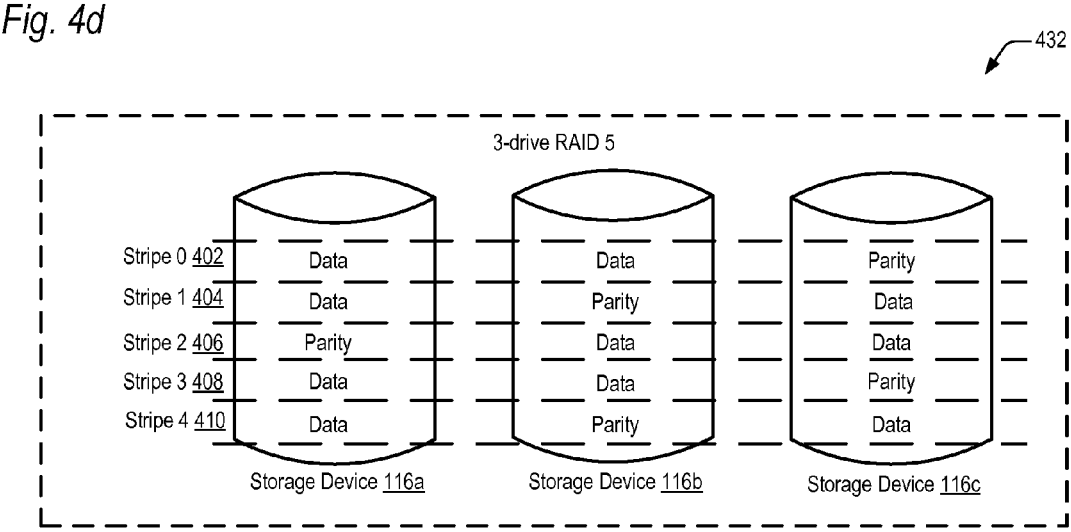
FIG. 4d is a block diagram illustrating organization of data on storage devices 116 for a 3-drive RAID 5 configuration 432 of the present invention.

Referring now to FIG. 4d, a block diagram illustrating organization of data on storage devices 116 for a 3-drive RAID 5 configuration 432 of the present invention is shown. The 3-drive RAID 5 configuration 432 uses two storage devices 116 to store data, with a third storage device 116 to store parity information. Parity information is distributed among each storage device 116 in a rotating fashion, with the first parity block in stripe 0 402 of storage device 116c, the second parity block in stripe 1 404 of storage device 116b, the third parity block in stripe 2 406 of storage device 116a, the fourth parity block in stripe 3 408 of storage device 116c, and so on. Assignment of parity blocks continues in this fashion to the last stripe on storage devices 116a, 116b, and 116c. All other blocks on storage devices 116a-c store data. As is well known in the art, the parity block within a stripe 402-410 is generated by exclusive-ORing the data in the data blocks within the same stripe 402-410. Therefore, for stripe 0 402, the parity block in storage device 116c is generated by exclusive ORing the data in stripe 0 402 of storage device 116a with the data in stripe 0 402 of storage device 116b. After the data in a stripe has been written and the parity calculated and written, the exclusive OR of the data and parity within the same stripe should be equal to zero.

Figure 4E:
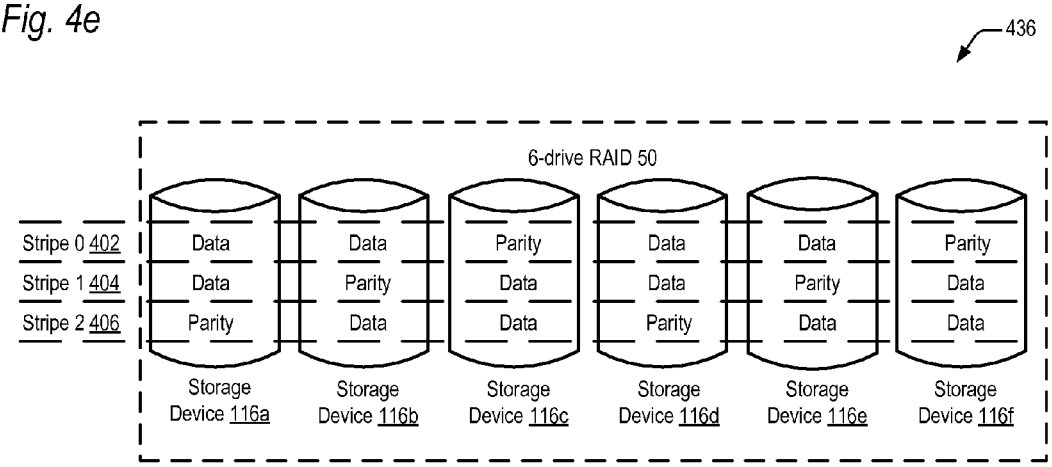
FIG. 4e is a block diagram illustrating organization of data on storage devices 116 for a 6-drive RAID 50 configuration 436 of the present invention.

Referring now to FIG. 4e, a block diagram illustrating organization of data on storage devices 116 for a 6-drive RAID 50 configuration 436 of the present invention is shown. In the embodiment depicted, the RAID 50 array 436 is formed by striping two different 3-drive RAID 5 arrays. The 6-drive RAID 50 configuration uses storage space equal to four storage devices 116 to store data, with storage space equal to two storage devices 116 to store parity information. Parity is rotated within each three storage device subgroup, with storage devices 116a, b, and c being the first subgroup, and storage devices d, e, and f being the second subgroup. Parity is also calculated within a subgroup, with the parity in a stripe of a subgroup equal to the exclusive OR of the data storage devices within the same stripe of the subgroup. Thus, the parity in stripe 1 404 of storage device 116e is the exclusive OR of the data in stripe 1 404 of storage device 116d and the data in stripe 1 404 of storage device 116f. For writes to stripe 1 404 that begin in the first subgroup and span the first and second subgroups, data is written to stripe 1 404 of storage devices 116a and c in the first subgroup addressed stripe, next parity is calculated and written to stripe 1 404 of storage device 116b. Third, data is written to storage devices 116d and f in the second subgroup addressed stripe, and finally parity is calculated and written to stripe 1 404 of storage device 116e. Alternatively, for a write beginning in the second subgroup of storage devices 116 and spanning both subgroups, the second subgroup must be written first, and the first subgroup must be written second. Data is written to stripe 1 404 of storage devices 116d and f in the second subgroup addressed stripe, next parity is calculated and written to stripe 1 404 of storage device 116e. Third, data is written to storage devices 116a and c in the next available stripe in the first subgroup—stripe 2 406, and finally parity is calculated and written to stripe 2 406 of storage device 116b.

Figure 4F:
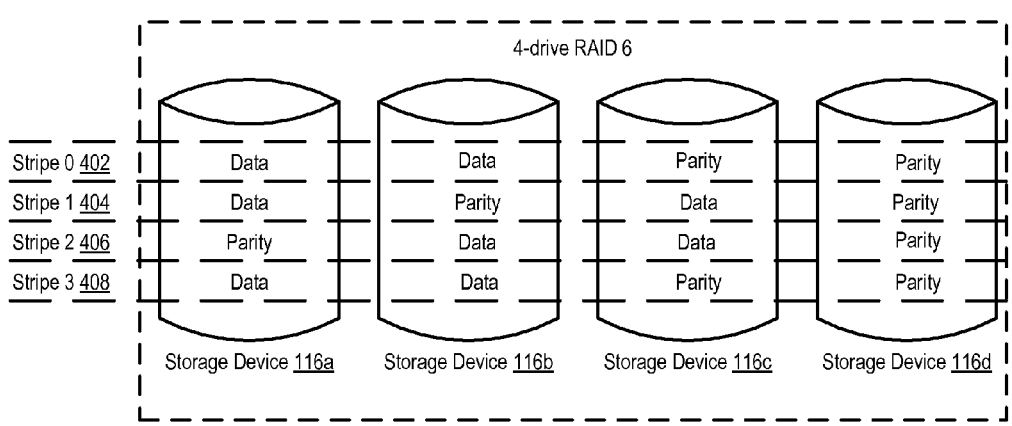
FIG. 4f is a block diagram illustrating organization of data on storage devices 116 for a 4-drive RAID 6 configuration 440 of the present invention.

Referring now to FIG. 4f, a block diagram illustrating organization of data on storage devices 116 for a 4-drive RAID 6 configuration 440 of the present invention is shown. RAID 6 is unique in that it allows up to two storage devices to fail and still be able to read data from the array. In the RAID 6 embodiment shown, within each stripe 402-408, two storage devices 116 have capacity allocated to storing data, with the other two storage devices 116 of capacity storing generated parity information. In stripe 0 402, storage devices 116a and b store data, while storage devices 116c and 116d store generated parity information. In stripe 2 406, storage devices 116b and c store data, while storage devices 116a and 116d store generated parity information. Written data proceeds in a stripe wise fashion, as previously discussed with respect to FIG. 4d for the 3-drive RAID 5 configuration 432.

Figure 5:
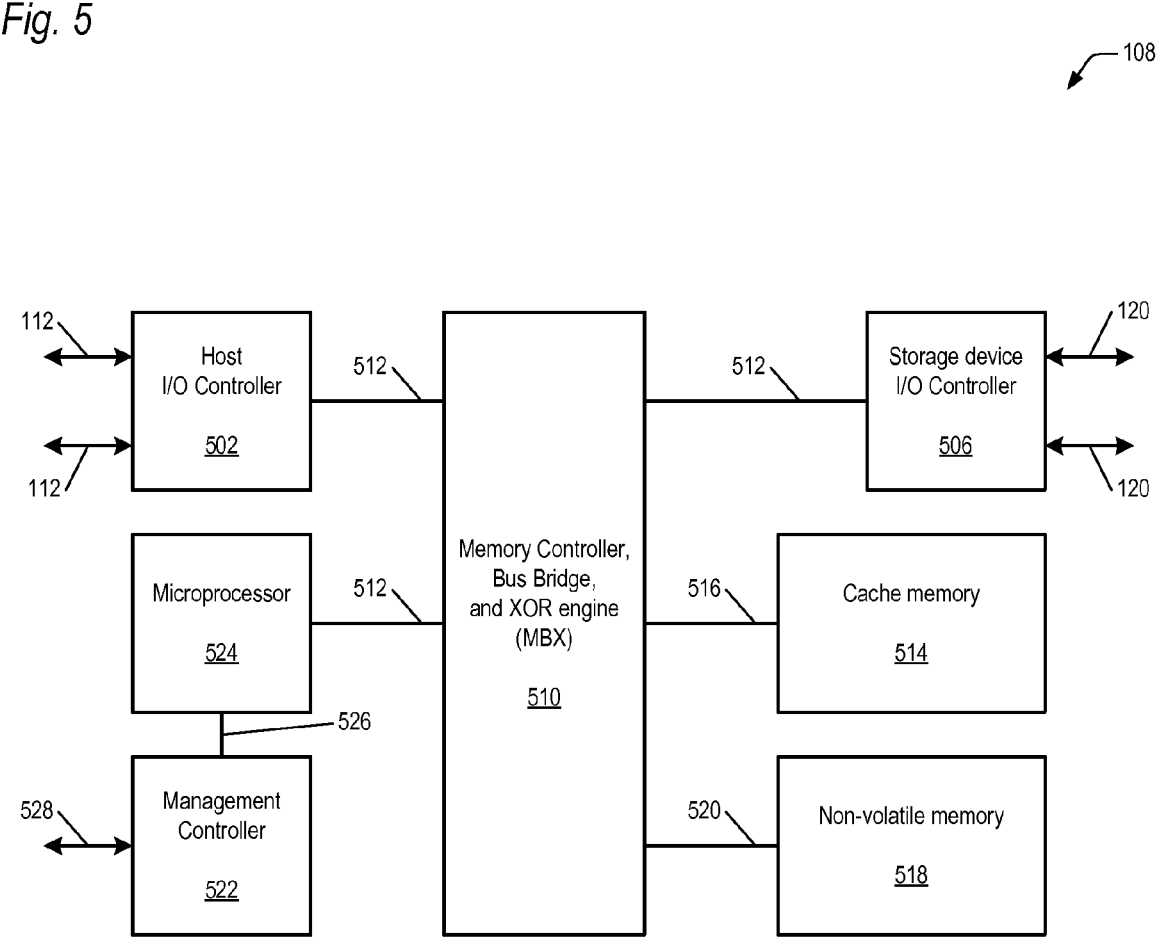
FIG. 5 is a block diagram illustrating RAID controller 108 of FIGS. 1 through 3 of the present invention.

Referring now to FIG. 5, a block diagram illustrating RAID controller 108 of the present invention is shown. Host I/O controller 502 receives I/O requests from host computers 104 attached to host buses 112, and transfers data to and from memory controller, bus bridge, and XOR engine (MBX) 510. There may be single or multiple host I/O controllers 502 and each host I/O controller 502 may have one or multiple host I/O ports that connect to host buses 112. Host buses 112 may be a single bus or multiple buses, and may be different types or topologies of buses according to the needs of the system the RAID controller 108 is employed within. Host buses 112 may also be an external bus type commonly used with external RAID controllers 108, as previously discussed with respect to FIG. 1a, or may be a local bus of a computer as described with respect to FIG. 2a.

Storage device I/O controller 506 transfers data to and from storage devices 116 over storage buses 120, to MBX 510. Storage device I/O controller 506 is coupled to MBX 510 by another local bus 512, which is typically a PCI, PCI-X, or PCI express bus, but may be any type of suitable local bus. There may be single or multiple storage device I/O controllers 506 and each storage device I/O controller 506 may have one or multiple storage device I/O ports that connect to storage buses 120. Storage buses 120 may be any suitable bus that can interface to storage devices, as discussed with reference to FIG. 1a.

In a preferred embodiment, MBX 510 transfers write data from host I/O controller 502 to cache memory 514, and read data from storage device I/O controller 506 to cache memory 514. MBX 510 is coupled to host I/O controller 502 and storage device I/O controller 506 each by a local bus 512, which is typically a PCI, PCI-X, or PCI express bus, but may be any type of suitable local bus. MBX 510 is an Application Specific Integrated Circuit (ASIC) in a preferred embodiment, but alternatively may be implemented as a chipset or group of components that collectively perform the functions described herein.

Microprocessor 524 manages data transfers between requesting host computers 104 and storage devices 116, handles errors, performs initialization and diagnostics where needed, and performs volume management for all RAID disk arrays. In some embodiments, microprocessor 524 also performs XOR and other RAID-related operations. Microprocessor 524 may be any sort of microprocessor suitable for use in a RAID controller 108, including but not limited to an X86 compatible processor, Power PC, MIPS, SPARC, ARM, or Alpha. Microprocessor 524 may be a monolithic device contained within a separate integrated circuit, or may be embedded in a chipset or other ASIC in a more integrated fashion. Microprocessor 524 is coupled to MBX 510 by microprocessor bus 512, which is typically a PCI, PCI-X, or PCI express bus, but may be any type of suitable local bus.

Management controller 522 allows system administrators to communicate remotely with RAID controller 108 and initially configure, change configuration, launch diagnostics, obtain debug and error logs, monitor performance, and perform similar configuration or monitoring tasks. Management controller 522 is coupled to microprocessor 524 by management controller I/O bus 526. Management controller I/O bus 526 may be any type of local interconnect such as a serial signal or low speed parallel interface, or a local bus such as PCI. Management controller 522 communicates with remote external computers over management bus 528, which is typically Ethernet or a telephone line to provide long distance remote communications. Although external computers coupled to management bus 528 may be host computers 104, they may also be management computers or client computers where a system administrator may configure and manage RAID controller 108.

Cache memory 514 provides temporary storage of read data, write data, and metadata, and is coupled to MBX 510 by volatile memory bus 516. Cache memory 514 is volatile Random Access memory (RAM), such as DRAM or DDR RAM, and volatile memory bus 516 is a bus suitable for carrying volatile memory control signals, such as a DRAM or DDR bus. In RAID controllers 108 that provide writeback caching, cache memory 514 is usually supplied with power from a secondary power source, such as a battery which is not shown, to maintain the data in cache memory 514 for a period of time if main power fails.

Non-volatile memory 518 is memory that maintains contents over power cycles, and is used to store error and debug logs. Non-volatile memory 518 is typically a type of memory such as Flash, non-volatile Static RAM (nvSRAM), or Magnetic RAM (MRAM). Non-volatile memory 518 is coupled to MBX 510 by non-volatile memory bus 520. Non-volatile memory bus 520 is a suitable simple interface such as an Industry Standard Architecture (ISA) bus or a local bus such as PCI.

Although a specific arrangement of components is depicted for RAID controller 108, it should be understood that many other arrangements are possible and contemplated. Therefore, the embodiment shown should be understood to be only one possible embodiment out of many such embodiments, and the present invention is able to be practiced on other embodiments as well.

Figure 6:
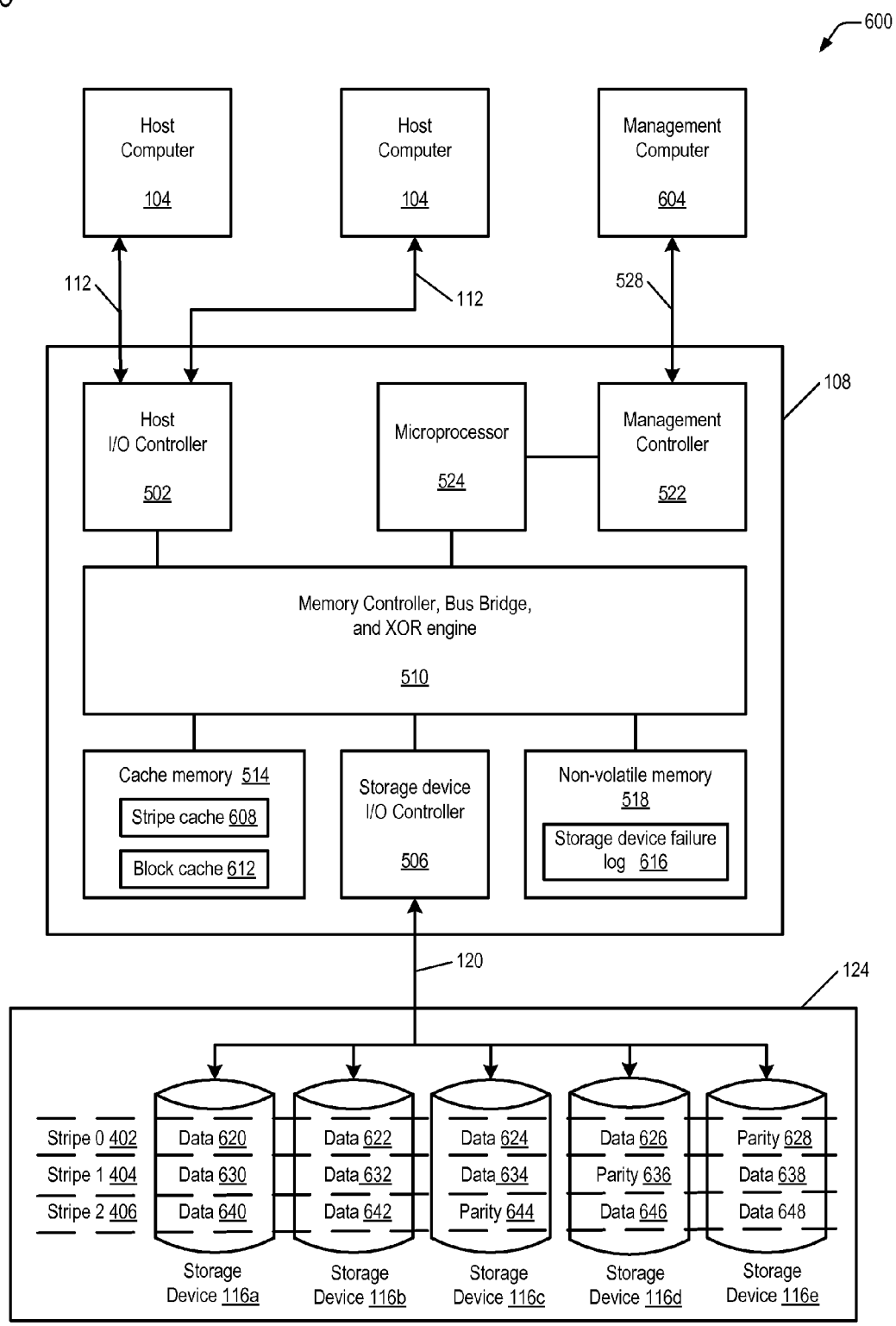
FIG. 6 is a block diagram illustrating RAID system 600 of the present invention.

Referring now to FIG. 6, a block diagram illustrating RAID system 600 of the present invention is shown. Host computers 104 send I/O requests to RAID controller 108 across host buses 112. RAID controller 108 sends read and write requests to storage devices 116 in storage subsystem 124 across storage bus 120. In the embodiment shown, five storage devices 116a-116e are configured in a RAID 5 configuration.

Data is stored on storage devices 116 in stripes, with three stripes 402, 404, and 406 shown. In stripe 0 402, blocks 620, 622, 624, and 626 store data and block 628 stores parity. In stripe 1 404, blocks 630, 632, 634, and 638 store data and block 636 stores parity. In stripe 2 406, blocks 640, 642, 646, and 648 store data and block 644 stores parity.

Management computer 604 is coupled to RAID controller 108 by management bus 528. System administrators manage RAID controller 108 and storage subsystem 124 through management computer 604. Management tasks including setup and configuration of RAID controller 108 and storage subsystem 124, and monitoring of event, error, and debug logs in RAID controller 108 may be performed, among other tasks. Specifically, error logs that identify failing storage devices 116 in storage subsystem 124 can be read from a storage device failure log 616 in non-volatile memory 518. This can allow a system administrator to take a specific action to repair or remedy the logged storage devices 116 failure in storage device failure log 616. Such actions include replacing failed storage devices 116, rebuilding data from failed storage devices 116 onto spare storage devices 116, or archiving data from storage devices 116 so that data recovery techniques and software applications can be used to attempt to recover lost data.

Cache memory 514 of RAID controller 108 has a first portion allocated to a stripe cache 608, which stores a stripe 402, 404, 406 of data read from storage devices 116a-116e. Data is read into stripe cache 608 as part of a scrub operation, which will be described with reference to FIGS. 7-9. Cache memory 514 of RAID controller 108 has a second portion allocated to a block cache 612, which stores a block 620-648 read from storage devices 116a-116e. Block cache 612 is used in conjunction with an analyze operation, which will be described with reference to FIGS. 10-12. Storage device failures identified by the analyze operation are stored in storage device failure log 616 of non-volatile memory 518, where they are readable by management computer 604 and can be acted upon by a system administrator.

Although a specific arrangement of components is depicted for RAID system 600, it should be understood that many other arrangements are possible and contemplated. Therefore, the embodiment shown should be understood to be only one possible embodiment out of many such embodiments, and the present invention is able to be practiced on other embodiments as well.

Figure 7:
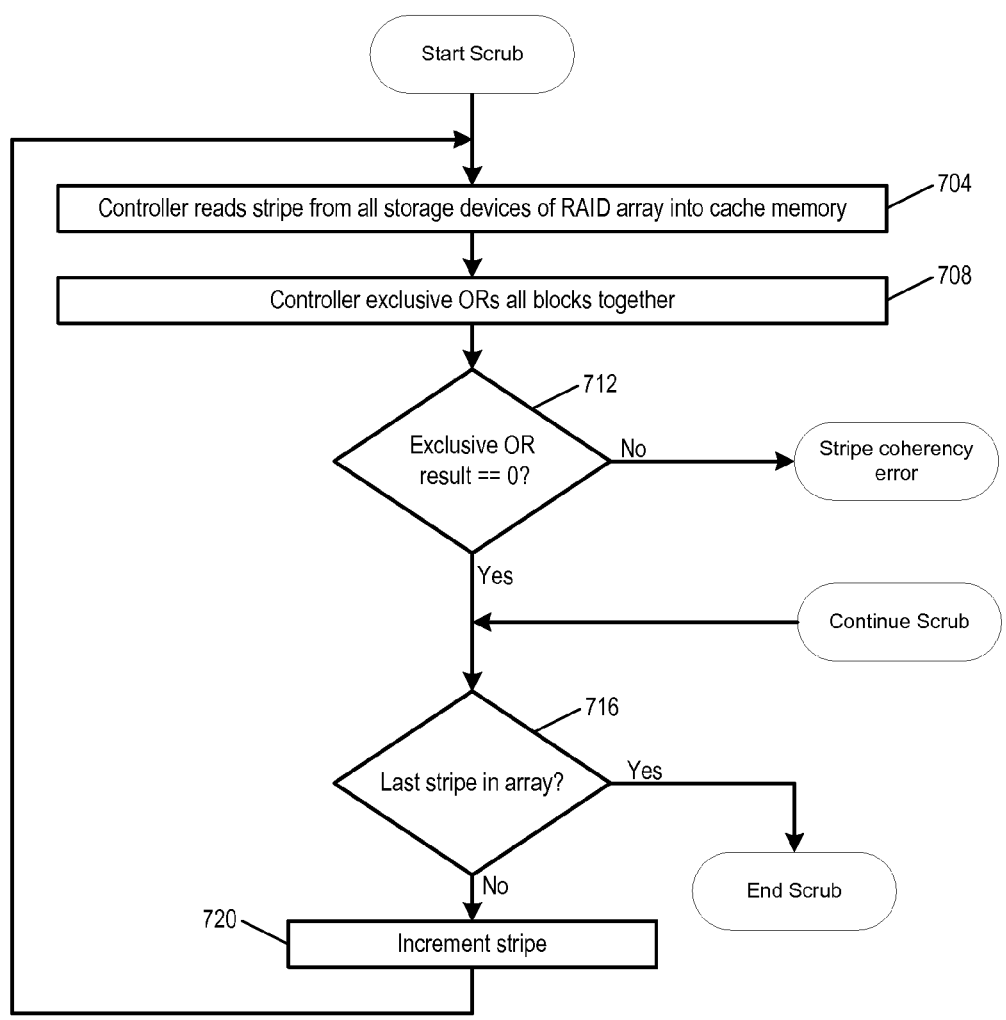
FIG. 7 is a flowchart illustrating the preferred embodiment of a scrub operation.

Referring now to FIG. 7, a flowchart illustrating the preferred embodiment of a scrub operation is shown. The description in FIGS. 7-9 assumes the RAID controller has already enabled the scrub operation, with the scrub operation beginning at the first program step in each FIG. 7-9. Flow begins at block 704.

At block 704, RAID controller 108 reads a stripe 402-410 from all storage devices 116 of a RAID array into cache memory 514, such as into stripe cache 608. For a parity-based RAID array, this means reading all data blocks and parity blocks within the same stripe. For a mirror-based RAID array, this means reading the data blocks in the same stripe for each set of storage devices 116 that constitute the mirrored array. Flow proceeds to block 708.

At block 708, the RAID controller exclusive ORs all blocks read in step 704. Flow proceeds to block 712.

At block 712, the RAID controller evaluates the result of the exclusive OR operation made in block 708. If the result of the exclusive OR operation was equal to zero, then the stripe 402-410 is coherent and flow proceeds to block 716. If the result of the exclusive OR operation was not equal to zero, then the stripe 402-410 is not coherent, potentially because one of the storage devices 116 in the array may have returned unreported corrupt data, and flow proceeds to one of the analyze phase processes in FIGS. 10-12.

At block 716, a check is made if the current stripe is the last stripe in the RAID array. If the current stripe is the last stripe in the RAID array, then the process ends. If the current stripe is not the last stripe in the RAID array, then flow proceeds to block 720.

At block 720, the current stripe is incremented. Flow proceeds back to block 704 to repeat the reading 704, exclusive ORing 708, comparing 712, and incrementing 720 steps until all stripes in the RAID array have been scrubbed.

Figure 8:
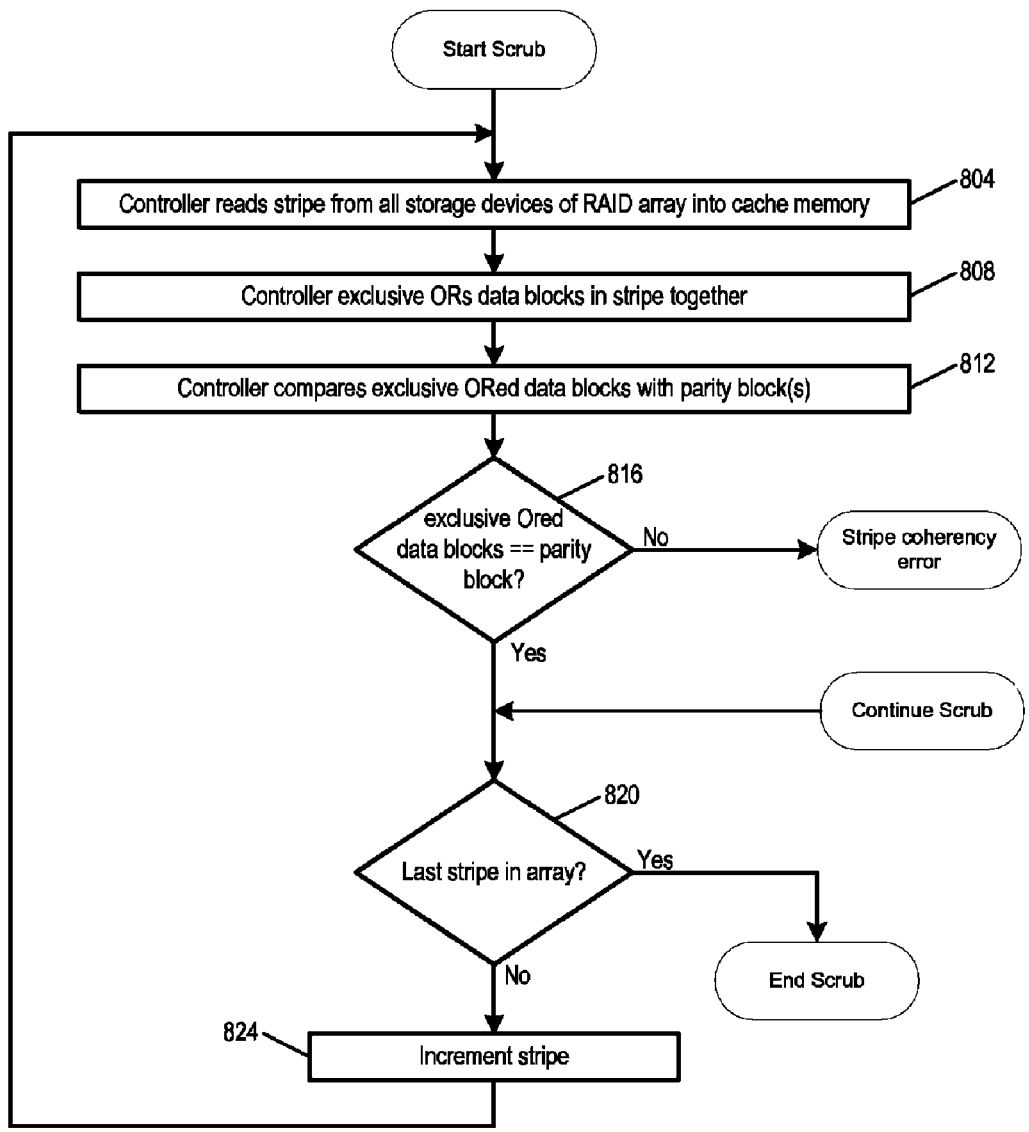
FIG. 8 is a flowchart illustrating an alternate embodiment of a scrub operation for a parity-based RAID array.

Referring now to FIG. 8, a flowchart illustrating an alternate embodiment of a scrub operation for a parity-based RAID array is shown. Flow begins at block 804.

At block 804, RAID controller 108 reads a stripe 402-410 from all storage devices 116 of a parity-based RAID array into cache memory 514. For a parity-based RAID array, this means reading all data blocks and parity blocks within the same stripe. Flow proceeds to block 808.

At block 808, the RAID controller exclusive ORs all data blocks read in step 804, leaving out parity blocks from the exclusive OR operation. Flow proceeds to block 812.

At block 812, the RAID controller compares the exclusive ORed data blocks from step 808 with the parity block(s) from the same stripe. Flow proceeds to block 816.

At block 816, the RAID controller evaluates the comparison of the exclusive OR of data blocks with the parity block(s) made in block 812. If the exclusive ORed data blocks are the same as the parity block(s), then the stripe is coherent and flow proceeds to block 820. If the exclusive ORed data blocks are not the same as the parity block(s), then the stripe is not coherent, potentially because one of the storage devices 116 in the array may have returned unreported corrupt data, and flow proceeds to one of the analyze phase processes in FIGS. 10-12.

At block 820, a check is made if the current stripe is the last stripe in the RAID array. If the current stripe is the last stripe in the RAID array, then the process ends. If the current stripe is not the last stripe in the RAID array, then flow proceeds to block 824.

At block 824, the current stripe is incremented. Flow proceeds back to block 804 to repeat the reading 804, exclusive ORing 808, comparing 812, and incrementing 824 steps until all stripes in the RAID array have been scrubbed.

Figure 9:
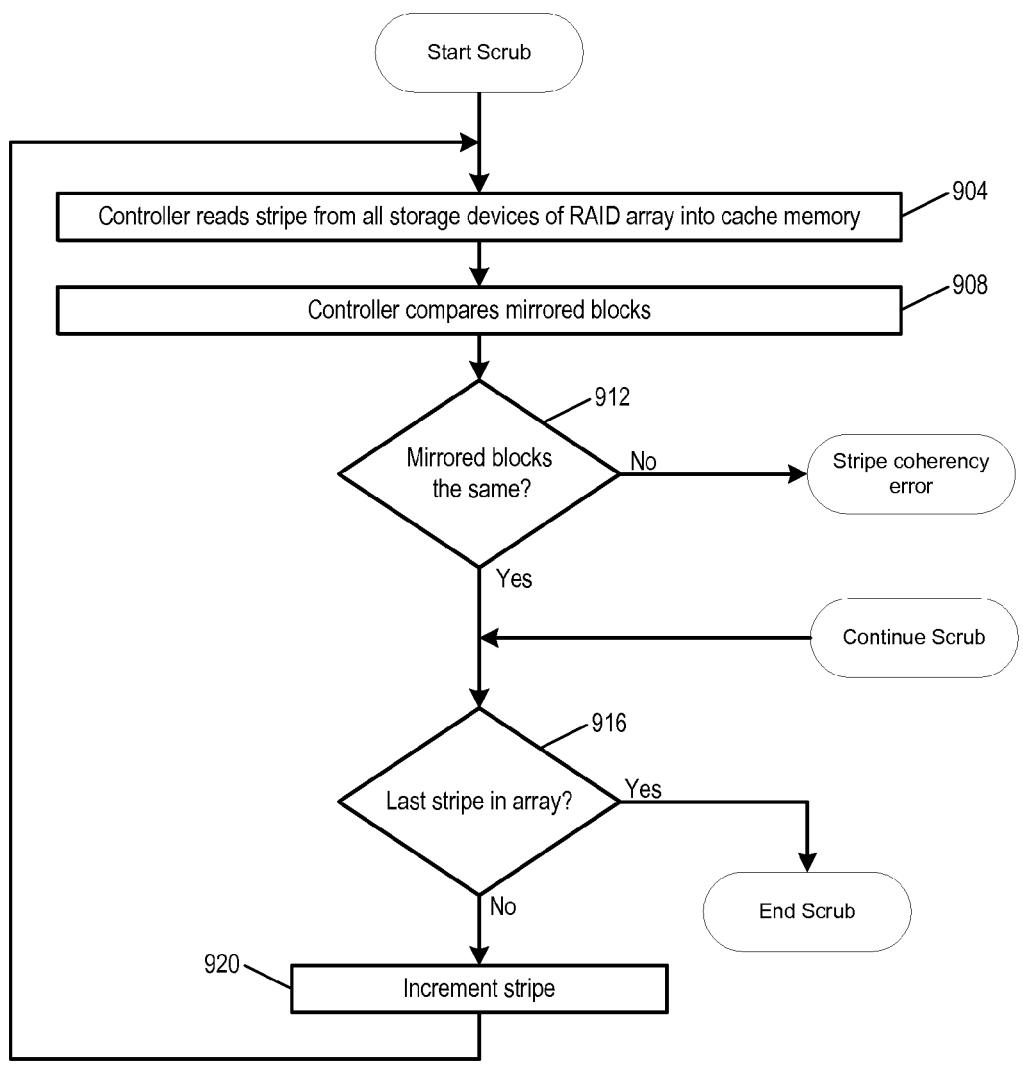
FIG. 9 is a flowchart illustrating an alternate embodiment of a scrub operation for a mirror-based RAID array.

Referring now to FIG. 9, a flowchart illustrating an alternate embodiment of a scrub operation for a mirror-based RAID array is shown. Flow begins at block 904.

At block 904, RAID controller 108 reads a stripe 402-410 from all storage devices 116 of a mirror-based RAID array into cache memory 514. For a mirror-based RAID array, this means reading the data blocks in the same stripe for each set of storage devices 116 that constitute the mirrored array. Flow proceeds to block 908.

At block 908, the RAID controller compares a pair of mirrored data blocks read in step 904. Flow proceeds to block 912.

At block 912, the RAID controller 108 evaluates the comparison of the mirrored data blocks made in block 908. If the mirrored data blocks are the same, then the stripe is coherent and flow proceeds to block 916. If the mirrored data blocks are not the same, then the stripe is not coherent, potentially because one of the storage devices 116 in the array may have returned unreported corrupt data, and flow proceeds to one of the analyze phase processes in FIGS. 10-12.

At block 916, a check is made if the current stripe is the last stripe in the RAID array. If the current stripe is the last stripe in the RAID array, then the process ends. If the current stripe is not the last stripe in the RAID array, then flow proceeds to block 920.

At block 924, the current stripe is incremented. Flow proceeds back to block 904 to repeat the reading 904, comparing 908, and incrementing 920 steps until all stripes in the RAID array have been scrubbed.

Figure 10:
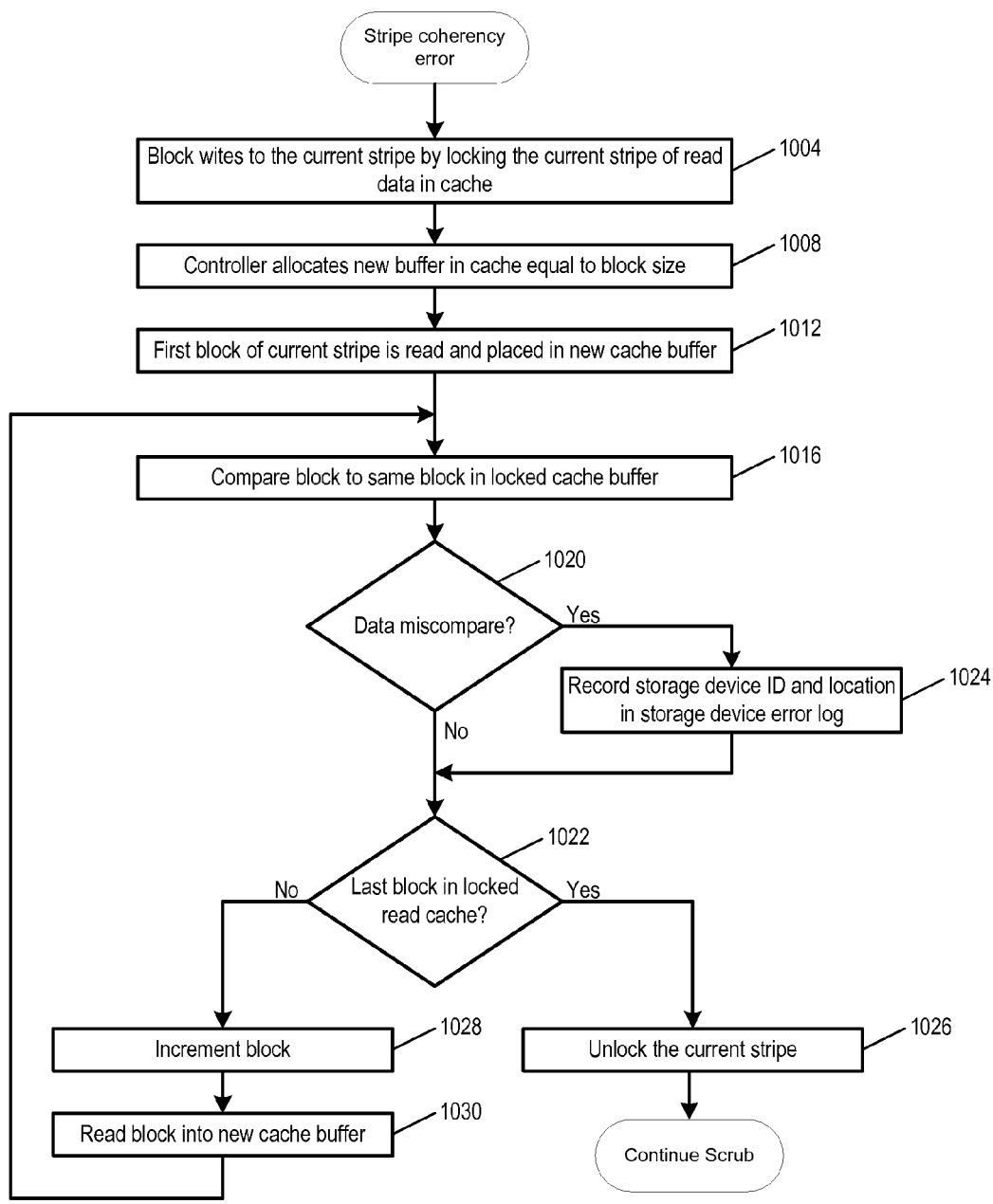
FIG. 10 is a flowchart illustrating the preferred embodiment of an analyze operation for a RAID array following a stripe coherency error.

Referring now to FIG. 10, a flowchart illustrating the preferred embodiment of an analyze operation for a RAID array following a stripe coherency error is shown. Flow begins at block 1004.

At block 1004, writes are blocked to the current stripe by locking the current stripe in stripe cache 608, i.e., the RAID controller 108 prevents writes to the current stripe of the redundant array. Recall that data is previously read into the stripe cache 608 in blocks 704, 804, and 904 of FIGS. 7, 8, and 9, respectively. Flow proceeds to block 1008.

At block 1008, the RAID controller allocates a new buffer in cache memory 514 equal to the block size. This new buffer will be the block cache 612 of FIG. 6. The size of block cache 612 will be the size of a block, which is the amount of data on one storage device 116 in one stripe 402-410. Flow proceeds to block 1012.

At block 1012, the first block of the data in stripe cache 608 is read again from the same location of the appropriate storage device 116 and placed into block cache 612. Flow proceeds to block 1016.

At block 1016, the block of data in block cache 612 is compared to the corresponding block of data in stripe cache 608, i.e., to the block in the stripe cache 608 read from the same location of storage device 116 at block 1012 (if this is the first time through the loop) or at block 1030 (if this is a subsequent time through the loop). Flow proceeds to block 1020.

At block 1020, if the blocks of data compared in step 1016 are the same, then flow proceeds to block 1022. If the blocks of data compared in step 1016 are different, the data miscompares and flow instead proceeds to block 1024.

At block 1024, the storage device ID and physical location corresponding to the storage device 116 containing the block of data that experienced the miscompare in step 1020 are recorded in storage device failure log 616. In the preferred embodiment, the storage device failure log 616 is stored in non-volatile memory 518. However, it may be stored additionally or in place of non-volatile memory 518 in cache memory 514, in a storage device 116, elsewhere in the RAID controller 108, or in a memory location of a computer containing a RAID software application 208 or failure identification software application 212. Physical location of the storage device 116 is commonly information such as equipment rack number, enclosure number, and slot number within the enclosure. However, it should be understood that physical location is any information that enables service personnel to find and replace the failing storage device 116, and may be different than equipment rack number, enclosure number, or slot number. The storage device ID may be a serial number or other value uniquely identifying the failing storage device 116. Flow proceeds to block 1022.

At block 1022, a check is made to determine if the data block just compared was the last data block in the stripe locked in stripe cache 608. If it was the last data block in stripe cache 608, then flow proceeds to block 1026. If it was not the last data block in stripe cache 608, then flow proceeds to block 1028.

At block 1026, the current stripe of data in stripe cache 608 is unlocked, enabling the data in the stripe cache 608 to be overwritten by the RAID controller 108. At this point, the analyze phase completes for the current stripe, and flow proceeds to blocks 716, 820, or 916 of FIGS. 7, 8, or 9, respectively, depending on which scrub embodiment was in effect when the analyze phase of FIG. 10 was invoked.

At block 1028, the block number 620-648 is incremented, which will select the next available block 620-648 in the current stripe 402-410. In particular, the next available block 620-648 in the current stripe 402-410 will be on the next storage device 116 in the redundant array. Flow proceeds to block 1030.

At block 1030, the new data block 620-648 corresponding to the incremented data block number in step 1028 is read from the appropriate storage device 116 and placed into block cache 612. Flow proceeds back to block 1016 to repeat the steps at blocks 1016 to 1030 until all blocks in the current stripe in stripe cache 608 have been analyzed.

Although the preferred embodiment of the analyze operation reads a stripe of data into stripe cache 608, other embodiments are contemplated in which different amounts of data are read into stripe cache 608. Similarly, other embodiments are contemplated in which different amounts of data are read into block cache 612. However, other amounts of data may produce different performance due to lower efficiency in reading, comparing, and logging. This applies equally to FIGS. 10, 11, and 12 of the present invention.

Figure 11:
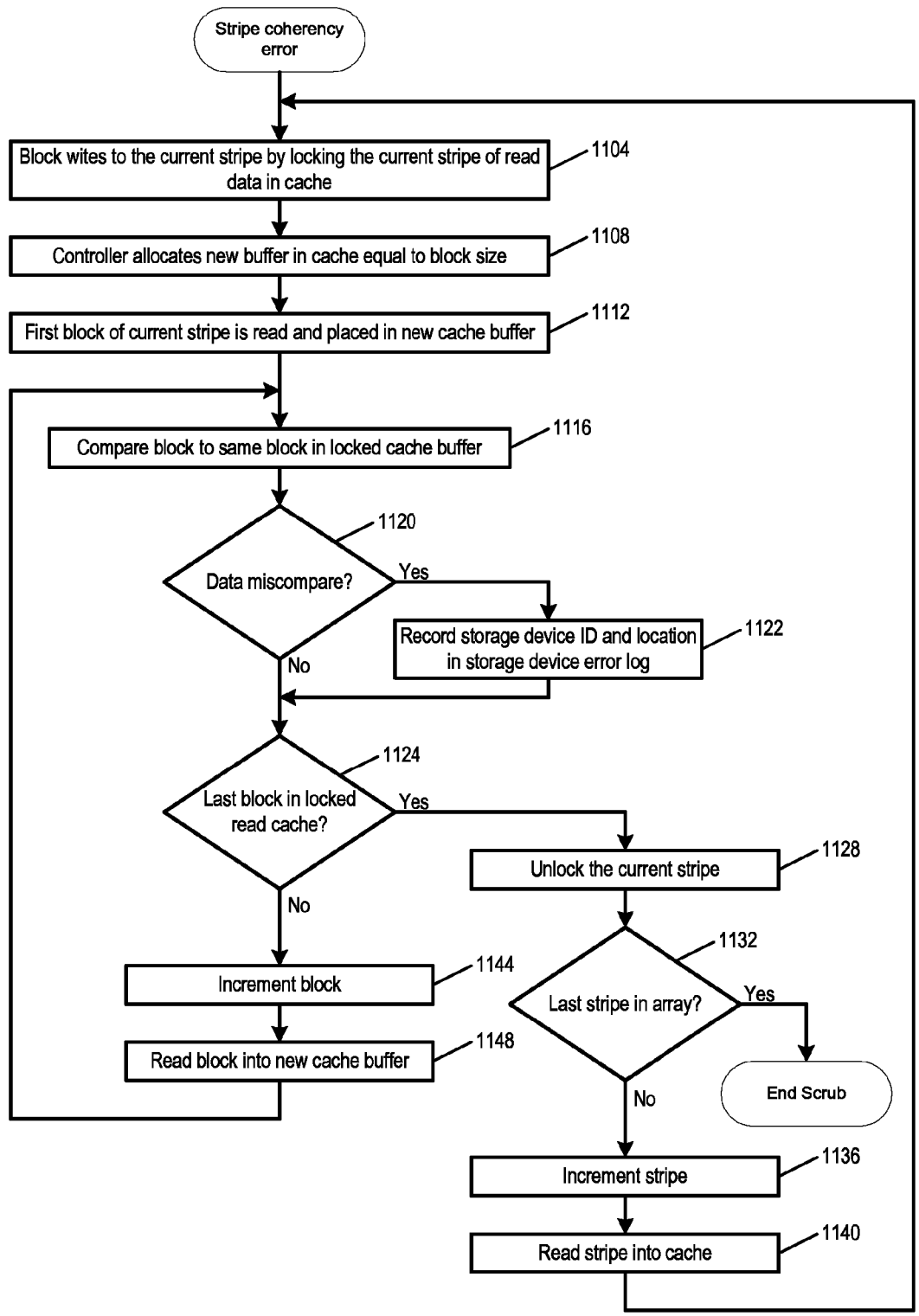
FIG. 11 is a flowchart illustrating a second embodiment of an analyze operation for a RAID array following a stripe coherency error.
Figure 12:
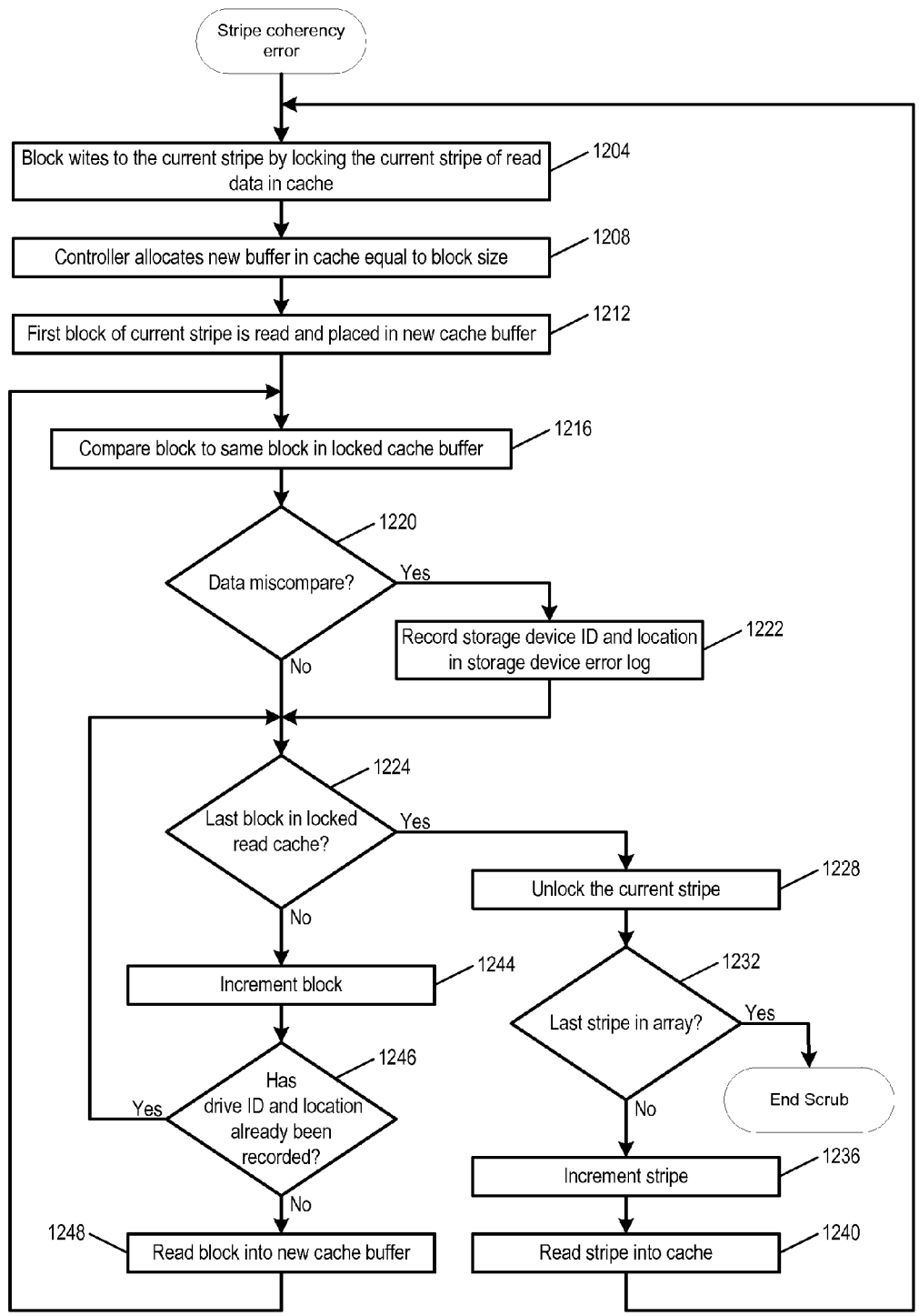
FIG. 12 is a flowchart illustrating a third embodiment of an analyze operation for a RAID array following a stripe coherency error.

The embodiments shown in FIGS. 10, 11, and 12 may be further modified to add a counter. The counter measures occurrences of coherency failures during stripe scrub operations, when there are no failing storage devices 116 identified within the same stripe. This keeps coherency errors from filling up memory space unnecessarily. However, once a first failing storage device 116 is identified, all subsequent coherency failures during stripe scrub operations will be logged in memory, even when there are no failing storage devices 116 identified within the same stripe.

Referring now to FIG. 11, a flowchart illustrating a second embodiment of an analyze operation for a RAID array following a stripe coherency error is shown. Flow begins at block 1104.

At block 1104, writes are blocked to the current stripe by locking the current stripe in stripe cache 608, i.e., the RAID controller 108 prevents writes to the current stripe of the redundant array. Recall that data is previously read into the stripe cache 608 in blocks 704, 804, and 904 of FIGS. 7, 8, and 9, respectively. Additionally, subsequent times through the outer loop of FIG. 11, the data is read into the stripe cache 608 at block 1140, as described below. Flow proceeds to block 1108.

At block 1108, the RAID controller 108 allocates a new buffer in cache memory equal to the block size. This new buffer will be the block cache 612 of FIG. 6. The size of block cache will be the size of a block, which is the amount of data on one storage device 116 in one stripe 402-410. Flow proceeds to block 1112.

At block 1112, the first block of the data in stripe cache 608 is read again from the same location of the appropriate storage device 116 and placed into block cache 612. Flow proceeds to block 1116.

At block 1116, the block of data in block cache 612 is compared to the corresponding block of data in stripe cache 608, i.e., to the block in the stripe cache 608 read from the same location of storage device 116 at block 1112 (if this is the first time through the inner loop) or at block 1148 (if this is a subsequent time through the inner loop). Flow proceeds to block 1120.

At block 1120, if the blocks of data compared in step 1116 are the same, then flow proceeds to block 1124. If the blocks of data compared in step 1116 are different, the data miscompares and flow instead proceeds to block 1122.

At block 1122, the storage device 116 ID and physical location corresponding to the storage device 116 containing the block of data that experienced the miscompare in step 1120 are recorded in storage device failure log 616. In the preferred embodiment, the storage device failure log 616 is stored in non-volatile memory 518. However, it may be stored additionally or in place of non-volatile memory 518 in cache memory 514, in a storage device 116, elsewhere in the RAID controller 108, or in a memory location of a computer containing a RAID software application 208 or failure identification software application 212. Physical location of the storage device is commonly information such as equipment rack number, enclosure number, and slot number within the enclosure. However, it should be understood that physical location is any information that enables service personnel to find and replace the failing storage device 116, and may be different than equipment rack number, enclosure number, or slot number. The storage device ID may be a serial number or other value uniquely identifying the failing storage device 116. Flow proceeds to block 1124.

At block 1124, a check is made to determine if the data block just compared was the last data block in the stripe locked in stripe cache 608. If it was the last data block in stripe cache 608, then flow proceeds to block 1128. If it was not the last data block in stripe cache 608, then flow proceeds to block 1144.

At block 1128, the current stripe of data in stripe cache 608 is unlocked, enabling the data in the stripe cache 608 to be overwritten by the RAID controller 108. Flow proceeds to block 1132.

At block 1132, a check is made to determine if the current stripe is the last stripe in the RAID array. If it is the last stripe in the RAID array, then the analyze and scrub phases both end immediately. If it is not the last stripe in the RAID array, then flow proceeds to block 1136.

At block 1136, the current stripe is incremented in preparation for the next stripe to be read into stripe cache 608. Flow proceeds to block 1140.

At block 1140, a new stripe of data corresponding to the incremented stripe number from block 1136 is read from storage devices 116 into stripe cache 608. Flow proceeds to block 1104, where the steps at blocks 1104 to 1140 are repeated for each of the data blocks in the new stripe in stripe cache 608.

At block 1144, the current data block number is incremented in preparation to reading the new data block into block cache 612. In particular, the next available block 620-648 in the current stripe 402-410 will be on the next storage device 116 in the redundant array. Flow proceeds to block 1148.

In block 1148, the data block corresponding to the new block number from block 1144 is read from the appropriate storage device 116 and placed into block cache 612. Flow proceeds to block 1116, where the steps at blocks 1116 to 1148 are repeated until the remaining data blocks of the RAID array have been analyzed.

Once the scrub phase from FIGS. 7, 8, or 9 transitions to block 1104 to enter the analyze phase of FIG. 11, control is never returned to the scrub process of FIGS. 7-9. Instead, the remaining data blocks of the RAID array are analyzed and checked for consistency.

Referring now to FIG. 12, a flowchart illustrating a third embodiment of an analyze operation for a RAID array following a stripe coherency error is shown. This embodiment is similar to that shown in FIG. 11, with the exception that this embodiment does not continue to analyze blocks on storage devices 116 that have previously been identified and recorded as failing storage devices 116. Flow begins at block 1204.

At block 1204, writes are blocked to the current stripe by locking the current stripe in stripe cache 608, i.e., the RAID controller 108 prevents writes to the current stripe of the redundant array. Recall that data is previously read into the stripe cache 608 in blocks 704, 804, and 904 of FIGS. 7, 8, and 9, respectively. Additionally, subsequent times through the outer loop of FIG. 12, the data is read into the stripe cache 608 at block 1240, as described below. Flow proceeds to block 1208.

At block 1208, the RAID controller allocates a new buffer in cache memory 514 equal to the block size. This new buffer will be the block cache 612 of FIG. 6. The size of block cache will be the size of a block, which is the amount of data on one storage device 116 in one stripe 402-410. Flow proceeds to block 1212.

At block 1212, the first block of the data in stripe cache 608 is read again from the same location of the appropriate storage device 116 and placed into block cache 612. Flow proceeds to block 1216.

At block 1216, the block of data in block cache 612 is compared to the corresponding block of data in stripe cache 608, i.e., to the block in the stripe cache 608 read from the same location of storage device 116 at block 1212 (if this is the first time through the inner loop) or at block 1248 (if this is a subsequent time through the inner loop). Flow proceeds to block 1220.

At block 1220, if the blocks of data compared in step 1216 are the same, then flow proceeds to block 1224. If the blocks of data compared in step 1216 are different, the data miscompares and flow instead proceeds to block 1222.

At block 1222, the storage device 116 ID and physical location corresponding to the storage device 116 containing the block of data that experienced the miscompare in step 1220 are recorded in storage device failure log 616. In the preferred embodiment, the storage device failure log 616 is stored in non-volatile memory 518. However, it may be stored additionally or in place of non-volatile memory 518 in cache memory 514, in a storage device 116, elsewhere in the RAID controller 108, or in a memory location of a computer containing a RAID software application 208 or failure identification software application 212. Physical location of the storage device is commonly information such as equipment rack number, enclosure number, and slot number within the enclosure. However, it should be understood that physical location is any information that enables service personnel to find and replace the failing storage device 116, and may be different than equipment rack number, enclosure number, or slot number. The storage device ID may be a serial number or other value uniquely identifying the failing storage device 116. Flow proceeds to block 1224.

At block 1224, a check is made to determine if the data block just compared was the last data block in the stripe locked in stripe cache 608. If it was the last data block in the stripe locked in stripe cache 608, then flow proceeds to block 1228. If it was not the last data block in stripe cache 608, then flow proceeds to block 1244.

At block 1228, the current stripe of data in stripe cache 608 is unlocked, enabling the data in the stripe cache 608 to be overwritten by the RAID controller 108. Flow proceeds to block 1232.

At block 1232, a check is made to determine if the current stripe is the last stripe in the RAID array. If it is the last stripe in the RAID array, then the analyze and scrub phases both end immediately. If it is not the last stripe in the RAID array, then flow proceeds to block 1236.

At block 1236, the current stripe is incremented in preparation for the next stripe to be read into stripe cache 608. Flow proceeds to block 1240.

At block 1240, a new stripe of data corresponding to the incremented stripe number from block 1236 is read from storage devices 116 into stripe cache 608. Flow proceeds to block 1204, where the steps at blocks 1204 to 1248 are repeated for each of the data blocks in the new stripe in stripe cache 608.

At block 1244, the current data block number is incremented in preparation for checking to see if the data block has already been recorded as failing in storage device failure log 616. In particular, the next available block 620-648 in the current stripe 402-410 will be on the next storage device 116 in the redundant array. Flow proceeds to block 1246.

At block 1246, the incremented data block number from block 1244 is checked against storage device 116 ID and location information stored in storage device failure log 616. If there is a match, then the data block number has been previously recorded as a failing storage device 116 and flow proceed to block 1224, bypassing the steps at blocks 1248, 1216, and 1220 since the storage device 116 has previously been identified as failing. If there is not a match, then flow proceeds to block 1248.

At block 1248, the data block corresponding to the new block number from block 1244 is read from the appropriate storage device 116 and placed into block cache 612. Flow proceeds to block 1216, where the steps at blocks 1216 to 1248 are repeated until the remaining data blocks of the RAID array have been analyzed.

Once the scrub phase from FIGS. 7, 8, or 9 transitions to block 1204 to enter the analyze phase of FIG. 12, control is never returned to the scrub process of FIGS. 7-9. This is the same as shown in FIG. 11. Instead, the remaining data blocks of the RAID array are analyzed and checked for consistency.

Any of the scrub phases in FIGS. 7-9 may be combined with the any of the analyze phases in FIGS. 10-12, depending on preference and objectives. It should be understood that other combinations not specifically shown here are within the scope of the present invention. Memory organization, RAID controller details, data transfer sizes, system architecture, storage device arrangement, and many other parameters can be modified without deviating from the scope of the invention.

Figure 13:
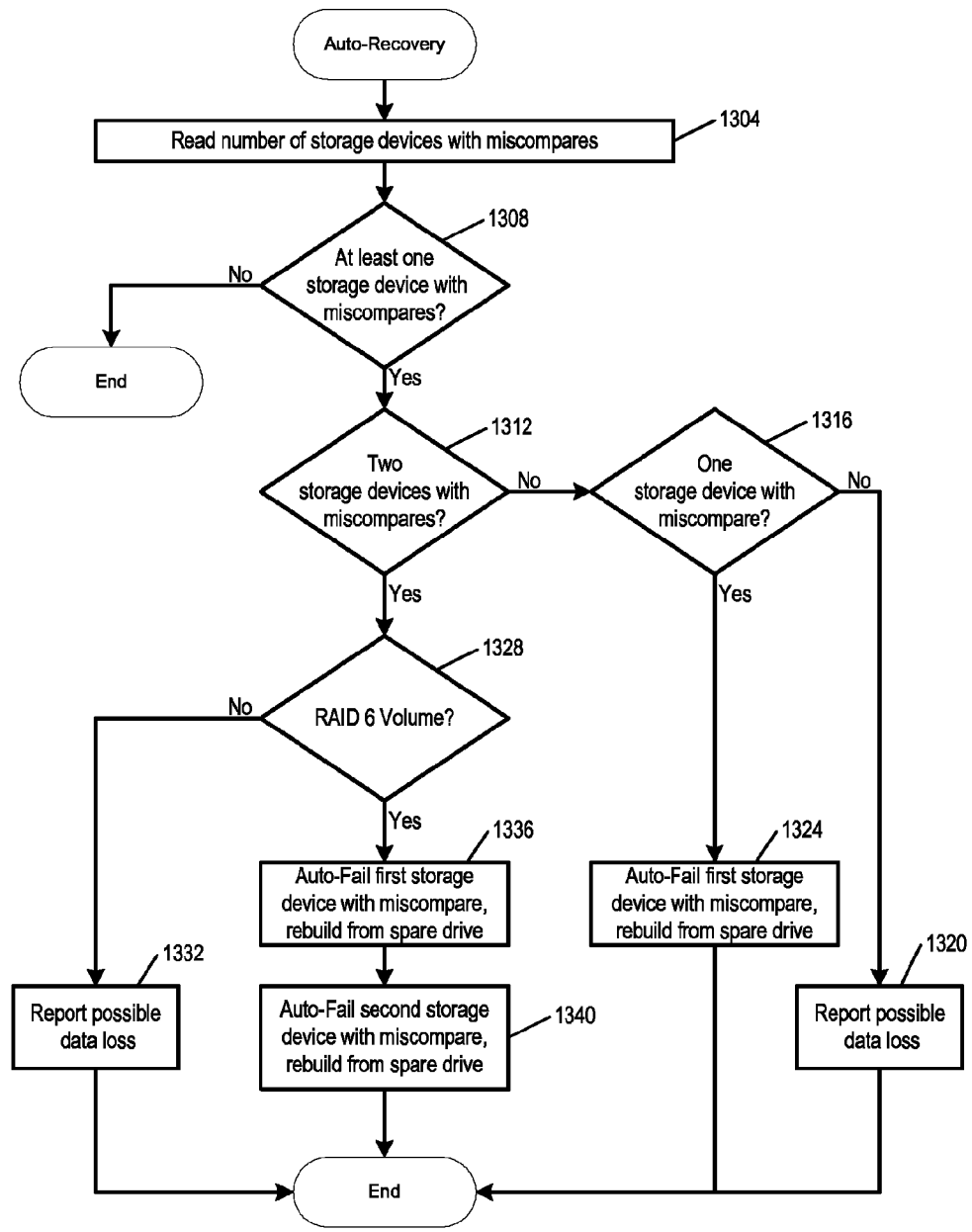
FIG. 13 is a flowchart illustrating an auto-recovery process following the completion of the processes described in FIGS. 7-12.

Referring now to FIG. 13, a flowchart illustrating an auto-recovery process following the completion of the processes described in FIGS. 7-12 is shown. Auto-recovery allows the RAID controller 108 to automatically rebuild failed storage devices 116 to available spare storage devices 116, if the number of recorded storage device failures 616 is within the redundancy capability of the RAID level being used. Flow begins at block 1304.

At block 1304, the RAID controller 108 reads the number of storage devices 116 with miscompares from storage device failure log 616 in non-volatile memory 518. Flow proceeds to block 1308.

At block 1308, a check is made to see if at least one storage device 116 had a miscompare. If no storage devices 116 have a miscompare, then the process ends since there are no storage devices 116 to rebuild. If at least one storage device 116 has a miscompare, then flow proceeds to block 1312.

At block 1312, a check is made to determine if two storage devices 116 have miscompares. If two storage devices 116 have miscompares, then flow proceeds to block 1328. If one storage device 116 has miscompares or more than two storage devices 116 have miscompares, then flow proceeds to block 1316.

At block 1316, a check is made to see if only one storage device 116 had a miscompare. If only one storage device 116 had a miscompare, then flow proceeds to block 1324. If only one storage device 116 did not have a miscompare, this means that more than two storage devices 116 had miscompares, and flow proceeds to block 1320.

At block 1320, a message reporting possible data loss is sent by management controller 522 to management computer 604. If more than two storage devices 116 fail, it is beyond the repair capability of conventional RAID levels, and permanent data loss is possible. A system administrator or user needs to determine a best course of action to recover lost data. The process ends after block 1320.

At block 1324, only one storage device 116 has a recorded miscompare. Therefore, for any redundant RAID level, it is possible to recover the data on the failing storage device 116. RAID controller 108 does this by auto-failing the reported storage device 116, and rebuilding data that was on the failed storage device 116 by reading data from the other storage devices 116 of the RAID array, and writing data to an available spare storage device 116. The process ends after block 1324.

At block 1328, the storage device failure log 616 has identified two storage devices 116 with miscompares. A check is made to see if the RAID level of the RAID array containing the storage devices 116 is RAID 6. RAID 6 is the only RAID level of conventional redundant RAID levels that can tolerate up to two storage device 116 failures. If the RAID level of the RAID array is RAID 6, then flow proceeds to block 1336. If the RAID level of the RAID array is other than RAID 6, flow proceeds to block 1332.

At block 1332, a message reporting possible data loss is sent by management controller 522 to management computer 604. If two storage devices 116 fail, it is beyond the repair capability of RAID levels other than RAID 6, and permanent data loss is possible. A system administrator or user needs to determine a best course of action to recover lost data. The process ends after block 1332.

At block 1336, two storage devices 116 have recorded miscompares. Since the RAID level of the RAID array recording the miscompares is RAID 6, it is possible to recover the data on the failing storage devices 116. RAID controller 108 does this by auto-failing the first reported storage device 116, and rebuilding data that was on the first failed storage device 116 by reading data from the other storage devices 116 of the RAID 6 array, and writing data to an available spare storage device 116. Flow proceeds to block 1340.

At block 1340, one of two storage devices 116 have been rebuilt to a spare storage device 116. If another spare storage device 116 is available, RAID controller 108 auto-fails the second reported storage device 116, and rebuilds data that was on the second failed storage device 116 by reading data from the other storage devices 116 of the RAID array, and writing data to the available spare storage device 116. The process ends after block 1340.

Figure 14A:
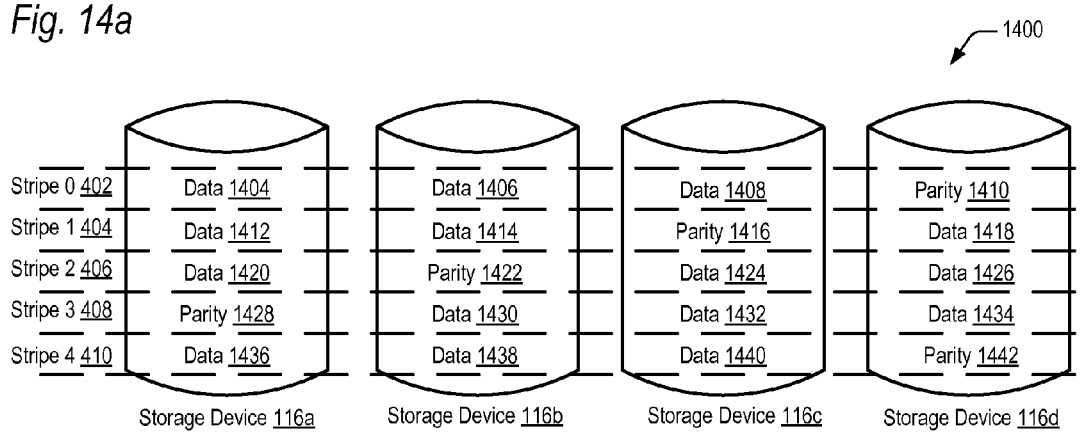
FIG. 14a is a block diagram illustrating the data organization for a RAID 5 array with four storage devices.

Referring now to FIG. 14*a*, a block diagram illustrating the data organization for a RAID 5 array with four storage devices is shown. RAID 5 array 1400 contains four storage devices 116*a*-116*d*. All four storage devices 116*a*-116*d* are striped, with stripe 0 402 through stripe 4 410 shown. Each stripe is organized into blocks, with three data blocks and one parity block in a RAID 5 array with 4 storage devices 116. Parity blocks 1410, 1416, 1422, 1428, and 1442 are distributed in a rotating fashion per stripe, with all other blocks being data blocks. FIGS. 14*b* to 14*f* and 15*a* to 15*b* and 16*a* to 16*b* illustrate examples of operation of embodiments of the present invention by referring to the redundant array of FIG. 14*a*.

Figure 14B:
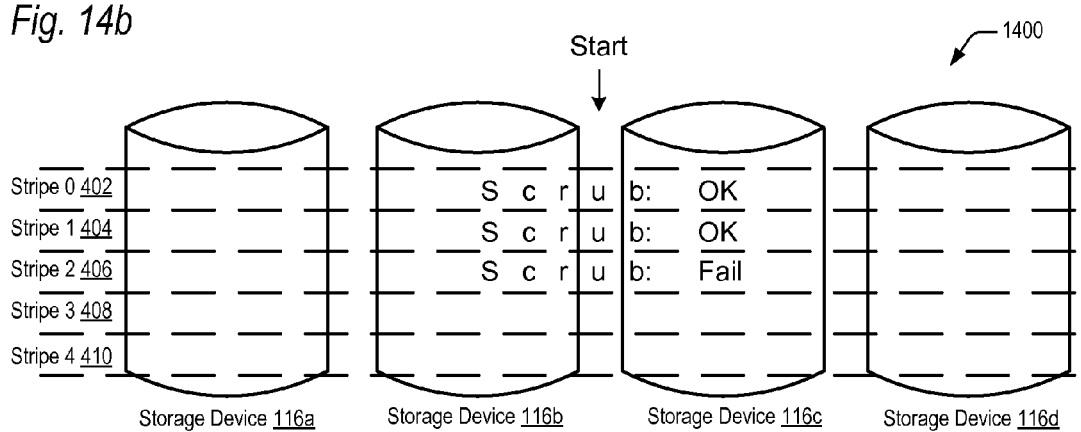

Referring now to FIG. 14*b*, a block diagram illustrating the first portion of the scrub process of the preferred embodiment, applied to the RAID 5 array 1400 of FIG. 14*a* is shown. This diagram assumes that the scrub process is previously enabled. The scrub process starts by reading stripe 0 402 into stripe cache 608 of cache memory 514 of RAID controller 108. RAID controller 108 then exclusive ORs blocks 1404, 1406, 1408, and 1410 together. The result of the exclusive OR operation is zero, meaning that stripe 0 402 is coherent and the data read from storage devices 116 is correct. RAID controller 108 then increments the stripe to stripe 1 404, and reads the stripe into stripe cache 608. The scrub process then exclusive ORs blocks 1412, 1414, 1416, and 1418 together. Once more, the result of the exclusive OR operation is zero, meaning that stripe 1 404 is coherent and the data read from storage devices 116 is correct. RAID controller 108 then increments the stripe to stripe 2 406, and reads the stripe into stripe cache 608. The scrub process then exclusive ORs blocks 1420, 1422, 1424, and 1426 together. This time, the result of the exclusive OR operation is not equal to zero, meaning that stripe 2 406 is not coherent, namely, corrupt data within stripe 2 406 was returned but not reported by any of the storage devices 116 in the redundant array. This then invokes the analyze process to find a failing storage device 116, as described in FIG. 14*c*.

Figure 14C:
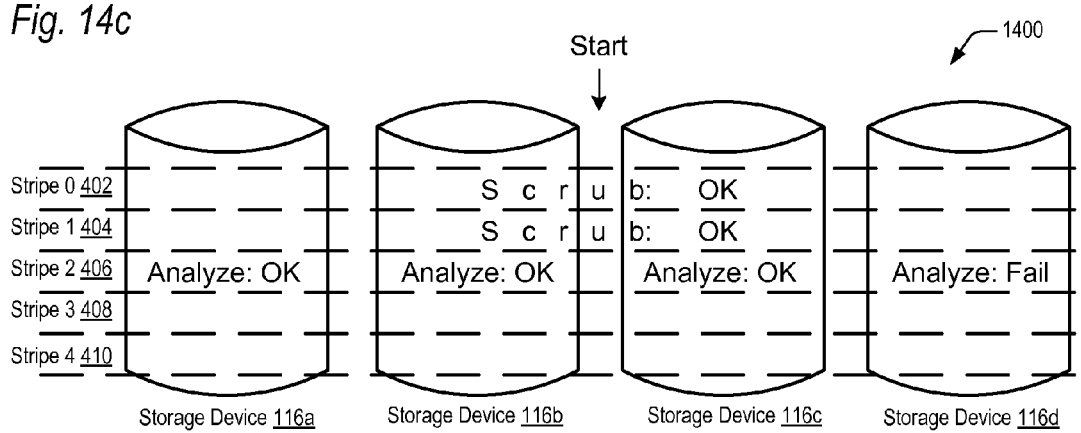

Referring now to FIG. 14*c*, a block diagram illustrating the first portion of the analyze process of the preferred embodiment, applied to the RAID 5 array 1400 of FIG. 14*a* is shown. Now that an incoherent stripe 2 406 has been identified in FIG. 14*b*, blocks in stripe 2 406 must be analyzed in order to determine which storage device 116 is producing the bad data. RAID controller 108 first locks stripe cache 608, which prevents writes directed to data within stripe 2 406 from changing the data. Next, RAID controller 108 allocates additional buffer space in cache memory 514 as block cache 612, where the size of the buffer is the same as the block size. The first block of stripe 2 406, block 1420, is read into block cache 612. RAID controller 108 compares block 1420 with the same block 1420 previously read into stripe cache 608. The blocks match, so the analyze process passes for block 1420. The process reads and compares blocks 1422 and 1424 after this, and finds no errors. However, when block 1426 is read and compared with the same block 1426 in stripe cache 608, the data is not identical. This means that storage device 116*d* is a failing storage device 116 because it returned corrupted data without reporting the corruption, and the ID and location of storage device 116*d* are recorded in the storage device failure log 616 in non-volatile memory 518. RAID controller 108 next unlocks stripe cache 608 in preparation for scrubbing the next stripe.

Figure 14D:
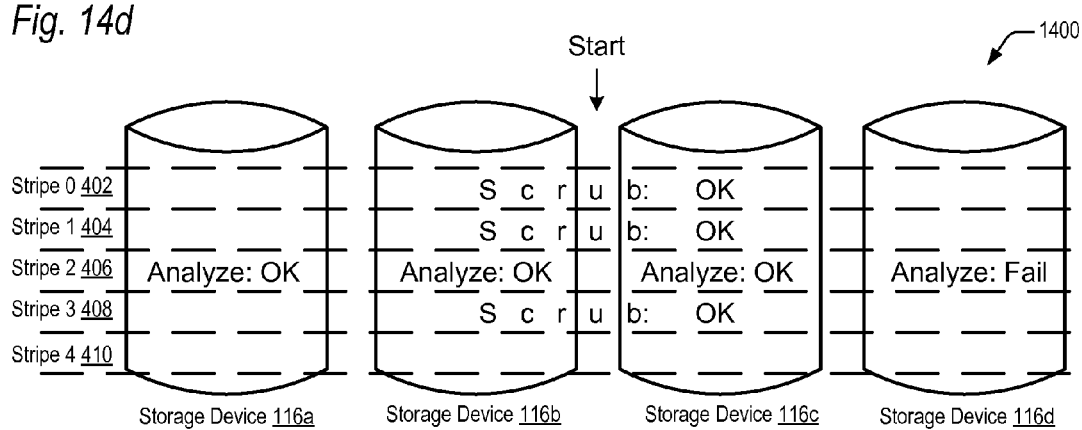

Referring now to FIG. 14*d*, a block diagram illustrating the second portion of the scrub process of the preferred embodiment, applied to the RAID 5 array 1400 of FIG. 14*a* is shown. Following the identification of failing storage device 116*d* in FIG. 4*c*, the scrub process continues on the next stripe, stripe 3 408. Stripe 3 408 is read into stripe cache 608 of cache memory 514 of RAID controller 108. RAID controller 108 then exclusive ORs blocks 1428, 1430, 1432, and 1434 together. The result of the exclusive OR operation is zero, meaning that stripe 3 408 is coherent and the data read from storage devices 116 is correct.

Figure 14E:
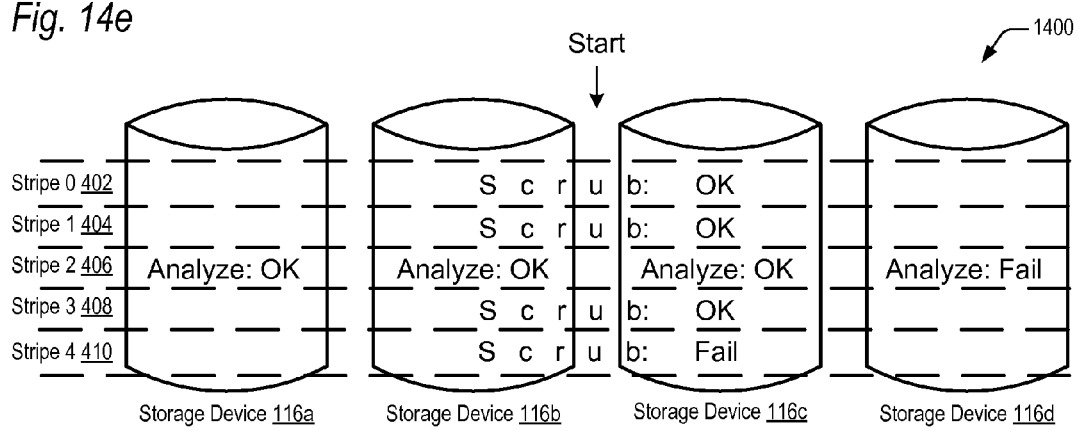

Referring now to FIG. 14*e*, a block diagram illustrating the third portion of the scrub process of the preferred embodiment, applied to the RAID 5 array 1400 of FIG. 14*a* is shown. Following the scrub process of stripe 3 408 in FIG. 14*d*, RAID controller 108 increments the stripe to stripe 4 410, and reads the stripe into stripe cache 608. The scrub process then exclusive ORs blocks 1436, 1438, 1440, and 1442 together. The result of the exclusive OR operation is not equal to zero, meaning that stripe 4 410 is not coherent, namely, corrupt data within stripe 4 410 was returned but not reported by any of the storage devices 116 in the redundant array.

Figure 14F:
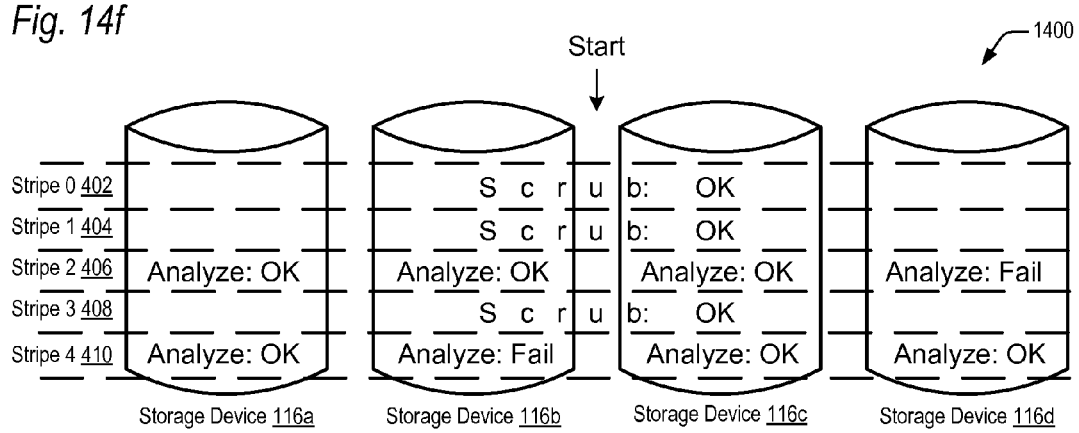

Referring now to FIG. 14*f*, a block diagram illustrating the second portion of the analyze process of the preferred embodiment, applied to the RAID 5 array 1400 of FIG. 14*a* is shown. Now that an incoherent stripe 4 410 has been identified in FIG. 14*e*, blocks in stripe 4 410 must be analyzed in order to determine which storage device 116 is producing the bad data. RAID controller 108 first locks stripe cache 608, which prevents writes directed to data within stripe 4 410 from changing the data. Next, RAID controller 108 allocates additional buffer space in cache memory 514 as block cache 612, where the size of the buffer is the same as the block size. The first block of stripe 4 410, block 1436, is read into block cache 612. RAID controller 108 compares block 1436 with the same block previously read into stripe cache 608. The blocks match, so the analyze process passes for block 1436. The process reads and compares block 1438 with the same block in stripe cache 608, and the data is not identical. This means that storage device 116*b* is a failing storage device 116 because it returned corrupted data without reporting the corruption, and the ID and location of storage device 116*b* are recorded in the storage device failure log 616 in non-volatile memory 518. The analyze process repeats for blocks 1440 and 1442, and finds no errors. Therefore, at the conclusion of the scrub and analyze phases for RAID 5 array 1400, storage devices 116*b* and 116*d* have been identified as failing storage devices 116, and are logged in storage device failure log 616 accordingly.

Figure 15A:
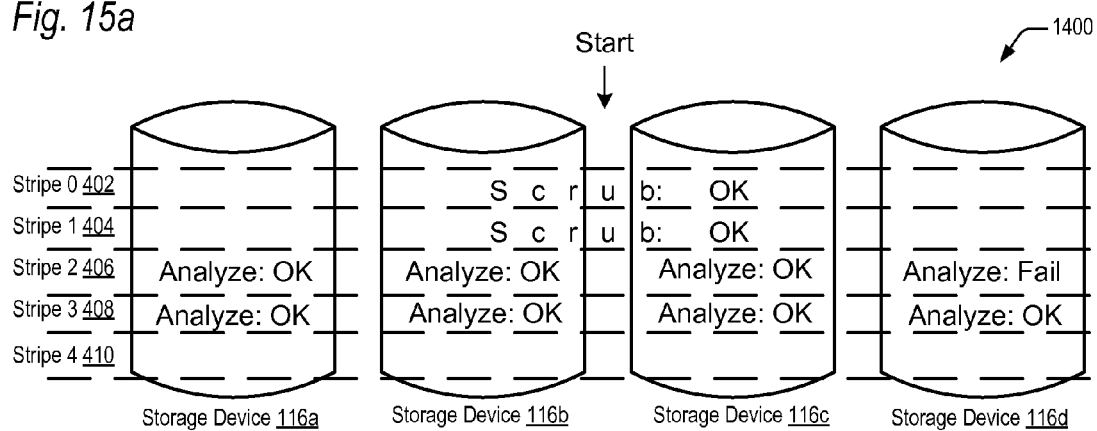

Referring now to FIG. 15*a*, a block diagram illustrating the second portion of the analyze process of an alternate embodiment, applied to the RAID 5 array 1400 of FIG. 14*a* is shown. This diagram and the diagram of FIG. 15*b* assumes the RAID 5 array 1400 of FIG. 14*a* is being used to store data and the scrub and analyze processes of FIGS. 14*b* and 14*c* have already occurred. Following the identification of failing storage device 116*d* in FIG. 4*c*, RAID controller 108 remains in the analyze process until the completion of analyzing all remaining blocks in RAID array 1400. The scrub process is not returned to, after a first failing storage device is identified. The current stripe is incremented to the next stripe, stripe 3 408. Stripe 3 408 is read into stripe cache 608 of cache memory 514 of RAID controller 108. RAID controller 108 first locks stripe cache 608, which prevents writes directed to data within stripe 3 408 from changing the data. Next, RAID controller 108 allocates additional buffer space in cache memory 514 as block cache 612, where the size of the buffer is the same as the block size. The first block of stripe 3 408, block 1428, is read into block cache 612. RAID controller 108 compares block 1428 with the same block previously read into stripe cache 608. The blocks match, so the analyze process passes for block 1428. The analyze process repeats for blocks 1430, 1432 and 1434, and finds no errors. RAID controller 108 next unlocks stripe cache 608 in preparation for reading the next stripe.

Figure 15B:
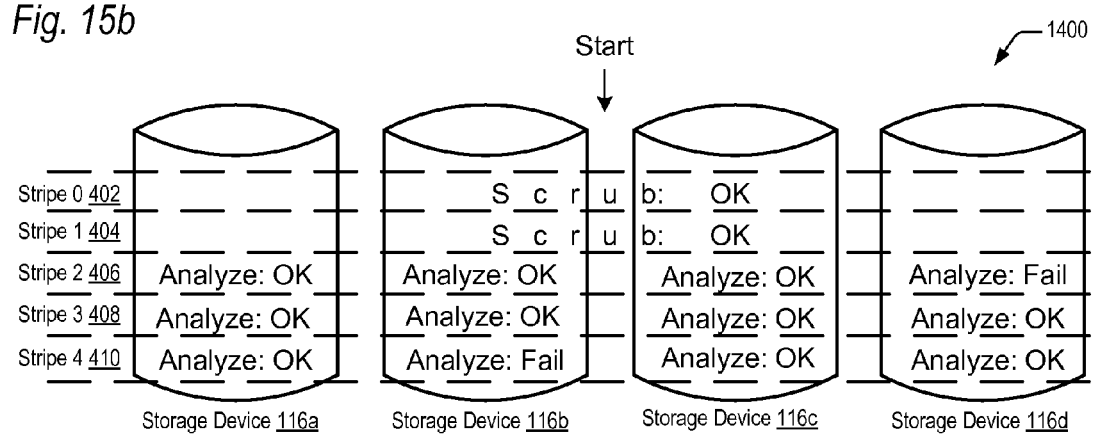

Referring now to FIG. 15*b*, a block diagram illustrating the third portion of the analyze process of an alternate embodiment, applied to the RAID 5 array 1400 of FIG. 14*a* is shown. The current stripe is incremented to the next stripe, stripe 4 410. Stripe 4 410 is read into stripe cache 608 of cache memory 514 of RAID controller 108. RAID controller 108 first locks stripe cache 608, which prevents writes directed to data within stripe 4 410 from changing the data. Next, RAID controller 108 allocates additional buffer space in cache memory 514 as block cache 612, where the size of the buffer is the same as the block size. The first block of stripe 4 410, block 1436, is read into block cache 612. RAID controller 108 compares block 1436 with the same block previously read into stripe cache 608. The blocks match, so the analyze process passes for block 1436. The analyze process increments the block number to 1438 and reads block 1438 into block cache 612. RAID controller 108 compares block 1438 with the same block previously read into stripe cache 608. The blocks do not match, so the analyze process identifies storage device 116*b*, containing block 1438, as a failing storage device because it returned corrupted data without reporting the corruption, and records the ID and location of storage device 116*b* in the storage device failure log 616 in non-volatile memory 518. The analyze process repeats for blocks 1440 and 1442 and finds no errors. RAID controller 108 next unlocks stripe cache 608 in preparation for scrubbing the next stripe. Therefore, at the conclusion of the scrub and analyze phases for RAID 5 array 1400, storage devices 116*b* and 116*d* have been identified as failing storage devices 116, and are logged in storage device failure log 616 accordingly.

Figure 16A:
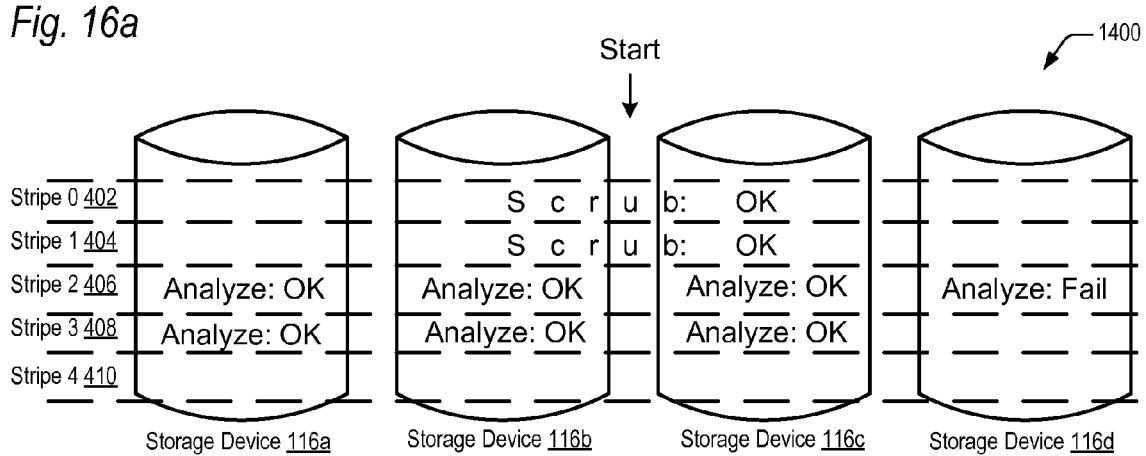

Referring now to FIG. 16*a*, a block diagram illustrating the second portion of the analyze process of an alternate embodiment, applied to the RAID 5 array 1400 of FIG. 14*a* is shown. This diagram and the diagram of FIG. 16*b* assumes the RAID 5 array 1400 of FIG. 14*a* is being used to store data and the scrub and analyze processes of FIGS. 14*b* and 14*c* have already occurred. Following the identification of failing storage device 116*d* in FIG. 4*c*, RAID controller 108 remains in the analyze process until the completion of analyzing all remaining blocks in RAID array 1400. The scrub process is not returned to, after a first failing storage device 116 is identified. The current stripe is incremented to the next stripe, stripe 3 408. Stripe 3 408 is read into stripe cache 608 of cache memory 514 of RAID controller 108. RAID controller 108 first locks stripe cache 608, which prevents writes directed to data within stripe 3 408 from changing the data. Next, RAID controller 108 allocates additional buffer space in cache memory 514 as block cache 612, where the size of the buffer is the same as the block size. The first block of stripe 3 408, block 1428, is read into block cache 612. RAID controller 108 compares block 1428 with the same block previously read into stripe cache 608. The blocks match, so the analyze process passes for block 1428. The analyze process repeats for blocks 1430 and 1432, and finds no errors. The analyze process for block 1434 is skipped, since the storage device 116 containing block 1434, storage device 116*d*, has already been identified as a failing storage device 116. RAID controller 108 next unlocks stripe cache 608 in preparation for reading the next stripe.

Figure 16B:
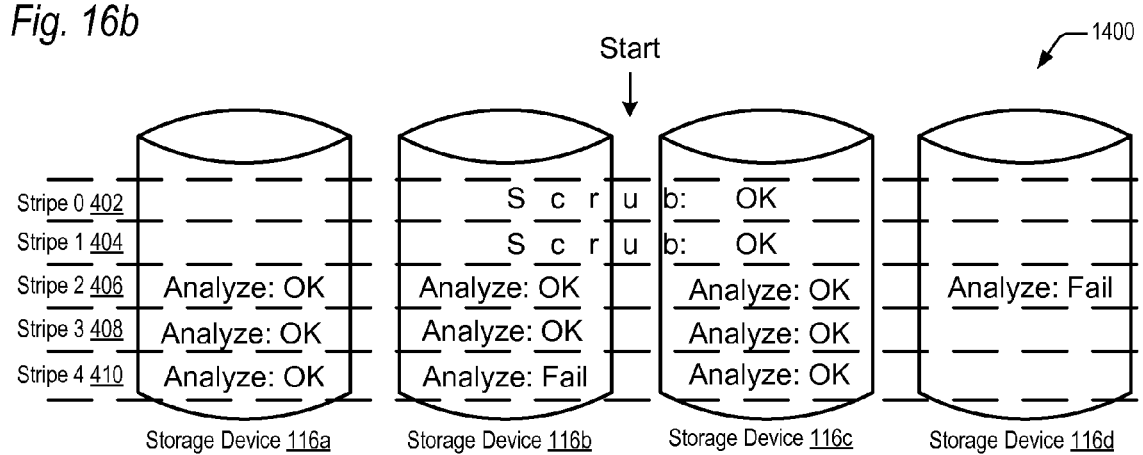

Referring now to FIG. 16*b*, a block diagram illustrating the third portion of the analyze process of an alternate embodiment, applied to the RAID 5 array 1400 of FIG. 14*a* is shown. The current stripe is incremented to the next stripe, stripe 4 410. Stripe 4 410 is read into stripe cache 608 of cache memory 514 of RAID controller 108. RAID controller 108 first locks stripe cache 608, which prevents writes directed to data within stripe 4 410 from changing the data. Next, RAID controller 108 allocates additional buffer space in cache memory 514 as block cache 612, where the size of the buffer is the same as the block size. The first block of stripe 4 410, block 1436, is read into block cache 612. RAID controller 108 compares block 1436 with the same block previously read into stripe cache 608. The blocks match, so the analyze process passes for block 1436. The analyze process increments the block number to 1438 and reads block 1438 into block cache 612. RAID controller 108 compares block 1438 with the same block previously read into stripe cache 608. The blocks do not match, so the analyze process identifies storage device 116*b*, containing block 1438, as a failing storage device 116 because it returned corrupted data without reporting the corruption, and records the ID and location of storage device 116*b* in the storage device failure log 616 in non-volatile memory 518. The analyze process repeats for block 1440 and finds no errors. Analyze is skipped for block 1442 since the storage device 116 containing block 1434, storage device 116*d*, has already been identified as a failing storage device 116. RAID controller 108 next unlocks stripe cache 608 in preparation for reading the next stripe. Note that in any stripes read after stripe 4 410, blocks on storage devices 116*b* and 116*d* will be skipped, since both storage devices 116 are identified as failing storage devices 116. At the conclusion of the scrub and analyze phases for RAID 5 array 1400, storage devices 116*b* and 116*d* have been identified as failing storage devices 116, and are logged in storage device failure log 616 accordingly.

Finally, those skilled in the art should appreciate that they can readily use the disclosed conception and specific embodiments as a basis for designing or modifying other structures for carrying out the same purposes of the present invention without departing from the scope of the invention as defined by the appended claims.

I claim:

1. A method for a RAID controller to identify a storage device of a redundant array of storage devices that is returning corrupt data to the RAID controller, the method comprising:

(a) reading data from a location of each storage device in the redundant array of storage devices a first time;
(b) detecting that at least one storage device in the redundant array returned corrupt data;
(c) in response to said detecting that at least one storage device in the redundant array returned corrupt data, for each storage device in the redundant array, performing the following steps:
  reading data from the location of the storage device a second time without writing to the location in between said reading the first and second times;
  comparing the data read from the location of the storage device the first time with the data read from the location of the storage device the second time; and
  identifying the storage device as a failing storage device if the data read from the storage device the first time miscompares with the data read from the storage device the second time; and
(d) updating the location of each storage device to a new location and repeating steps (a), (b), and (c) for the new location.

2. The method as recited in claim 1, wherein said detecting comprises determining that the exclusive OR (XOR) of the data read from the location of each storage device in the redundant array of storage devices the first time is not equal to zero.

3. The method as recited in claim 2, wherein the redundant array of storage devices comprises at least one parity storage device.

4. The method as recited in claim 1, wherein said detecting step comprises determining that the exclusive OR (XOR) of the data storage devices in the redundant array of storage devices is different than a parity storage device in the redundant array of storage devices.

5. The method as recited in claim 1, wherein said detecting step comprises determining that the exclusive OR (XOR) of data on each pair of mirrored storage devices within the redundant array of storage devices is not equal to zero.

6. The method as recited in claim 1, wherein said detecting step comprises determining that data from a mirrored location is different than data from the location within the redundant array of storage devices.

7. The method as recited in claim 1, wherein said detecting step comprises a host computer notifying the RAID controller that corrupt data was provided to the host computer by the RAID controller.

8. The method as recited in claim 1, wherein said detecting step comprises another RAID controller notifying the RAID controller that at least one storage device in the redundant array returned corrupt data.

9. The method as recited in claim 1, wherein said reading a first time and said detecting only occurs when the RAID controller is not processing host I/O requests.

10. The method of claim 1, further comprising:
  incrementing a count each time said identifying identifies a storage device in the redundant array that returned corrupt data.

11. The method of claim 10, wherein an error indication is provided if the count reaches a predetermined value.

12. The method of claim 1, wherein said comparing step is performed in hardware on the RAID controller.

13. The method of claim 1, wherein said comparing step is performed in firmware on the RAID controller.

14. The method of claim 1, wherein said comparing step is performed in a software application on a computer.

15. The method of claim 1, wherein said identifying step comprises writing a value to a memory location in the RAID controller.

16. The method of claim 15, wherein the value comprises information specifying a storage device serial number and location within a storage enclosure.

17. The method of claim 15, wherein the value is transferred to a computer by the RAID controller.

18. The method of claim 15, wherein the memory location comprises values identifying failed storage devices within the redundant array of storage devices.

19. The method of claim 15, further comprising:
  rebuilding the redundant array of storage devices using a spare storage device after said identifying the storage device as a failing storage device.

20. The method of claim 19, wherein the RAID controller performs said rebuilding automatically without user intervention.

21. The method of claim 15, further comprising rebuilding the redundant array of storage devices using two spare storage devices after said identifying two storage devices as failing storage devices.

22. The method of claim 21, wherein the failed storage devices in the redundant array of storage devices are rebuilt automatically by the RAID controller using spare storage devices after said identifying the storage devices as failing storage devices, without user intervention.

23. A RAID controller that identifies a storage device of a redundant array of storage devices that is returning corrupt data to the RAID controller, comprising:
  a memory; and
  a processor, coupled to the memory, configured to:
  (a) cause data to be read into the memory from a location of each storage device in the redundant array of storage devices a first time;
  (b) detect that at least one storage device in the redundant array returned corrupt data;
  (c) in response to detecting that at least one storage device in the redundant array returned corrupt data, for each storage device in the redundant array:
    cause data to be read into the memory from the location of the storage device a second time without writing to the location in between causing the data to be read the first and second times;
    cause the data read from the location of the storage device the first time to be compared with the data read from the location of the storage device the second time; and
    identify the storage device as a failing storage device if the data read from the storage device the first time miscompares with the data read from the storage device the second time; and
  (d) update the location of each storage device to a new location and repeat (a), (b), and (c) for the new location.

24. The RAID controller of claim 23, wherein the memory is configured to store a value that identifies the failing storage device within the redundant array of storage devices.

25. The RAID controller of claim 24, wherein the value comprises information specifying a storage device serial number and location within a storage enclosure of the failing storage device.

26. A method for a RAID controller to identify a storage device of a redundant array of storage devices that is returning corrupt data to the RAID controller, the method comprising:
  detecting that at least one storage device in the redundant array is returning corrupt data;

in response to said detecting that at least one storage device in the redundant array returned corrupt data, for each storage device in the redundant array, performing the following steps:

reading data from a location of the storage device a first time and reading data from the location of the storage device a second time without writing to the location in between said reading the first and second times;

comparing the data read the first time with the data read the second time;

identifying the storage device as the failing storage device if the data read the first time miscompares with the data read the second time; and updating the location of the storage device to a new location and repeating the reading, comparing, and identifying steps for the new location.

27. The method of claim 26, further comprising:
in response to said identifying the storage device as a failing storage device:
recording the storage device identity in a memory device.

28. The method of claim 27, further comprising:
in response to said identifying the storage device as a failing storage device:
repeating the reading, comparing, identifying, recording, and updating steps for each storage device in the redundant array of storage devices except for the failing storage device.

29. A computer program product to identify a storage device of a redundant array of storage devices that is returning corrupt data to a computer, the computer program product comprising:

first program code for reading data from a location of each storage device in the redundant array of storage devices a first time;

second program code for detecting that at least one storage device in the redundant array returned corrupt data;

third program code for performing the following steps for each storage device in the redundant array in response to said detecting that at least one storage device in the redundant array returned corrupt data:

reading data from the location of the storage device a second time without writing to the location in between said reading the first and second times;

comparing the data read from the location of the storage device the first time with the data read from the location of the storage device the second time; and identifying the storage device as a failing storage device if the data read from the storage device the first time miscompares with the data read from the storage device the second time; and fourth program code for updating the location of each storage device to a new location and repeating execution of the first, second, and third program code for the new location.

30. The computer program product of claim 29, further comprising:
fifth program code for performing RAID functions on the redundant array of storage devices.

31. The computer program product of claim 29, further comprising:
fifth program code for writing values to a computer memory, wherein the values specify a serial number and a location within a storage enclosure of the at least one storage device in the array that returned corrupt data.

32. A RAID controller that identifies a storage device of a redundant array of storage devices that is returning corrupt data to the RAID controller, comprising:

a memory; and a processor, coupled to the memory, configured to:

(a) detect that at least one storage device in the redundant array returned corrupt data;

(b) in response to detecting that at least one storage device in the redundant array returned corrupt data, for each storage device in the redundant array:

cause data to be read into the memory from a location of the storage device in the redundant array of storage devices a first time;

cause data to be read into the memory from the location of the storage device a second time without writing to the location in between causing the data to be read the first and second times;

cause the data read from the location of the storage device the first time to be compared with the data read from the location of the storage device the second time; and identify the storage device as a failing storage device if the data read from the storage device the first time miscompares with the data read from the storage device the second time; and (c) update the location of each storage device to a new location and repeat (a) and (b) for the new location.

* * * * *